United States Patent
Knighton

(10) Patent No.: US 9,324,324 B2
(45) Date of Patent: Apr. 26, 2016

(54) ADAPTIVE TELEPHONE RELAY SERVICE SYSTEMS

(71) Applicant: Nedelco, Inc., Aurora, NE (US)

(72) Inventor: Jeffery F. Knighton, Vail, AZ (US)

(73) Assignee: Nedelco, Inc., Aurora, NE (US)

( * ) Notice: Subject to any disclaimer, the term of this patent is extended or adjusted under 35 U.S.C. 154(b) by 0 days.

(21) Appl. No.: 14/662,008

(22) Filed: Mar. 18, 2015

(65) Prior Publication Data
US 2015/0341486 A1   Nov. 26, 2015

Related U.S. Application Data

(60) Provisional application No. 62/001,856, filed on May 22, 2014.

(51) Int. Cl.
| H04M 3/42 | (2006.01) |
| G10L 15/26 | (2006.01) |
| H04W 4/16 | (2009.01) |
| H04W 4/18 | (2009.01) |
| H04M 1/247 | (2006.01) |
| H04M 1/725 | (2006.01) |

(52) U.S. Cl.
CPC .............. *G10L 15/26* (2013.01); *H04M 1/2475* (2013.01); *H04M 3/42* (2013.01); *H04M 3/42221* (2013.01); *H04W 4/16* (2013.01); *H04W 4/18* (2013.01); *H04M 1/7255* (2013.01); *H04M 1/72591* (2013.01); *H04M 2250/74* (2013.01)

(58) Field of Classification Search
CPC .......... H04M 1/72591; H04M 1/7255; H04M 3/42221; H04M 4/16; H04M 4/18; G10L 15/26

USPC .................................................. 455/414.1
See application file for complete search history.

(56) References Cited

U.S. PATENT DOCUMENTS

| 5,710,806 | A | 1/1998 | Lee |
| 5,909,482 | A | 6/1999 | Engelke |
| 6,075,842 | A | 6/2000 | Engelke |
| 6,233,314 | B1 | 5/2001 | Engelke |
| 6,307,921 | B1 | 10/2001 | Engelke |
| 6,504,910 | B1 | 1/2003 | Engelke |
| 6,594,346 | B2 | 7/2003 | Engelke |
| 6,603,835 | B2 | 8/2003 | Engelke |
| 6,625,259 | B1 | 9/2003 | Hollatz |

(Continued)

FOREIGN PATENT DOCUMENTS

| CA | 2330948 A1 | 9/2001 |
| CA | 2804058 A1 | 3/2003 |

(Continued)

*Primary Examiner* — Nader Bolourchi
(74) *Attorney, Agent, or Firm* — Foley & Lardner LLP

(57) ABSTRACT

Adaptive telephone relay service systems. Embodiments herein provide technical solutions for improving text captioning of Captioned Telephone Service calls, including computer systems, computer-implemented methods, and computer program products for automating the text captioning of CTS calls. These technical solutions include, among other things, embodiments for generating text captions from speech data using an adaptive captioning service to provide full automated text captioning and/or operator assisted automated text captioning, embodiments for intercepting and modifying a calling sequence for calls to captioned telephone service users, and embodiments for generating progressive text captions from speech data.

20 Claims, 14 Drawing Sheets

(56) References Cited

U.S. PATENT DOCUMENTS

| | | |
|---|---|---|
| 6,701,162 B1 | 3/2004 | Everett |
| 6,816,468 B1 | 11/2004 | Cruickshank |
| 6,885,731 B2 | 4/2005 | Engelke |
| 6,950,500 B1 | 9/2005 | Chaturvedi |
| 7,003,082 B2 | 2/2006 | Engelke |
| 7,006,604 B2 | 2/2006 | Engelke |
| 7,164,753 B2 | 1/2007 | Engelke |
| 7,430,283 B2 | 9/2008 | Steel |
| 7,555,104 B2 | 6/2009 | Engelke |
| 7,660,398 B2 | 2/2010 | Engelke |
| 7,746,985 B2 | 6/2010 | Armstrong |
| 7,844,684 B2 | 11/2010 | Pettinato |
| 7,881,441 B2 | 2/2011 | Engelke |
| 8,014,765 B2 | 9/2011 | Pettinato |
| 8,204,179 B2 | 6/2012 | Goldman |
| 8,213,578 B2 | 7/2012 | Engleke |
| 8,265,671 B2 | 9/2012 | Gould |
| 8,285,819 B2 | 10/2012 | Pettinato |
| 8,379,801 B2 | 2/2013 | Romriell |
| 8,478,316 B2 | 7/2013 | Gould |
| 8,515,024 B2 | 8/2013 | Engelke |
| 8,526,581 B2 | 9/2013 | Charugundla |
| 8,781,510 B2 | 7/2014 | Gould |
| 2001/0004396 A1 | 6/2001 | Engelke |
| 2002/0085685 A1 | 7/2002 | Engelke |
| 2003/0019924 A1 | 1/2003 | Mullins |
| 2003/0125952 A1 | 7/2003 | Engelke |
| 2003/0212547 A1 | 11/2003 | Engelke |
| 2004/0017897 A1 | 1/2004 | Engelke |
| 2004/0028191 A1 | 2/2004 | Engelke |
| 2004/0076269 A1 | 4/2004 | Engelke |
| 2004/0111268 A1 | 6/2004 | Steel |
| 2005/0210516 A1 | 9/2005 | Pettinato |
| 2005/0226394 A1 | 10/2005 | Engelke |
| 2005/0226398 A1 | 10/2005 | Bojeun |
| 2006/0039542 A1 | 2/2006 | Engelke |
| 2006/0140354 A1 | 6/2006 | Engelke |
| 2007/0036282 A1 | 2/2007 | Engelke |
| 2007/0064894 A1 | 3/2007 | Armstrong |
| 2008/0152093 A1 | 6/2008 | Engleke |
| 2008/0294434 A1 | 11/2008 | Pettinato |
| 2009/0262906 A1 | 10/2009 | Goldman |
| 2010/0166155 A1 | 7/2010 | Charugundla |
| 2010/0323728 A1 | 12/2010 | Gould |
| 2011/0035218 A1 | 2/2011 | Pettinato |
| 2011/0123003 A1 | 5/2011 | Romriell |
| 2011/0170672 A1 | 7/2011 | Engelke |
| 2012/0250836 A1 | 10/2012 | Engleke |
| 2012/0250837 A1 | 10/2012 | Engleke |
| 2012/0302269 A1 | 11/2012 | Gould |
| 2013/0158995 A1 | 6/2013 | Romriell |
| 2013/0244705 A1 | 9/2013 | Gould |
| 2013/0304457 A1* | 11/2013 | Kang ................. G10L 13/00 704/201 |
| 2013/0308763 A1 | 11/2013 | Engelke |
| 2014/0266572 A1 | 9/2014 | Taggart |
| 2014/0270102 A1 | 9/2014 | Engelke |
| 2014/0282888 A1 | 9/2014 | Brooksby |

FOREIGN PATENT DOCUMENTS

| | | |
|---|---|---|
| CA | 2268582 C | 9/2008 |
| CA | 2419150 C | 4/2011 |
| CA | 2458372 C | 3/2013 |
| CA | 2525265 C | 3/2013 |
| CA | 2761343 C | 4/2013 |
| CA | 2556933 C | 10/2013 |
| CA | 2560178 C | 5/2014 |
| CA | 2613363 C | 9/2014 |
| EP | 1139642 A2 | 4/2001 |
| EP | 1627379 A2 | 2/2006 |
| EP | 1764990 A3 | 3/2007 |
| EP | 1897354 A1 | 3/2008 |
| EP | 2434482 A1 | 3/2012 |
| WO | WO9913634 A1 | 3/1999 |
| WO | WO02100084 A1 | 12/2002 |
| WO | WO2004102530 A3 | 11/2004 |
| WO | WO2005081511 A1 | 9/2005 |
| WO | WO2005094429 A3 | 10/2005 |
| WO | WO2007002777 A1 | 1/2007 |
| WO | WO2009128872 A1 | 10/2009 |

\* cited by examiner

ADAPTIVE TELEPHONE RELAY SERVICE SYSTEMS

CROSS-REFERENCE TO RELATED APPLICATIONS

This application claims priority to and the benefit of U.S. Provisional Patent Application Ser. No. 62/001,856, filed May 22, 2014 and entitled "IMPROVED TELEPHONE RELAY SERVICE SYSTEMS." The entire content of the foregoing application is expressly incorporated by reference herein in its entirety.

BACKGROUND

1. Field of the Invention

The present invention relates to various computer-implemented methods, computer systems, and computer program products for providing text of voice conversations to users using a form of telecommunications Relay Service, known as a Captioned Telephone Service.

2. Background and Relevant Art

According to a 2006 National Health Interview Survey conducted by the National Center for Health Statistics of the Centers for Disease Control and Prevention, there are at least 37 million adults in the U.S. that have some form of diminished hearing. Some persons are born with diminished hearing, some persons lose hearing due to injury, and many persons experience hearing loss while ageing. Persons with diminished hearing often experience isolation and difficulty communicating with others.

Participating in telephone calls is especially challenging for persons with diminished hearing. This is because the Public Switched Telephone Network (PSTN), due to technical limitations and legacy design constraints, provides an audio experience that uses only a fraction of the frequency spectrum that most humans are able to hear. For example, FIG. 1 illustrates that the frequency range conveyed by a standard landline (i.e., the portion labeled "low fidelity"), the part of the PSTN with which people are most familiar, is incapable of conveying much of the frequency spectrum associated with the pronunciations of one or more of j, m, f, s, th, v, d, g, n, ng, and e. Cellular voice networks, including Second-Generation (2G) and Third-Generation (3G) wireless technologies such as Code Division Multiple Access (CDMA), Global System for Mobile communication (GSM), and Enhanced Data rates for GSM Evolution (EDGE), which are also considered part of the PSTN, have similar limitations. While people with normal hearing are generally able to overcome the limitations of the PSTN by filling in the gaps based partly on the context of the communication, for people with diminished hearing there are often too many gaps to fill.

Under present technology, hearing and speech impaired individuals communicate over a telephone call with people without such impairments by means of a relay service (RS). Conventional RS's are offered by having a human operator participate in a 3-way conversation between the hearing or speech impaired individual and the remote party, with the operator providing assistance as needed to allow the two parties to communicate. One conventional form of relay service is called Captioned Telephone Service (CTS). A CTS provides a textual transcription (i.e., captions) of the remote party's portion of a live telephone conversation, enabling persons with hearing loss to both listen to and read the words spoken by the remote party in the conversation. FIG. 2 illustrates a conventional CTS telephone, which includes a display for presenting text captions of the words spoken by the remote party.

FIG. 3A illustrates an overview of some conventional CTS implementations. In FIG. 3A, a CTS phone 301 (e.g., the CTS phone of FIG. 2) of a CTS party 301a is in a bi-directional voice communication with a remote party device 303 (e.g., landline phone, cellular device) of a remote party 303a. A CTS provider 302 is also involved in the communication, at least to the extent that the remote party device 303 transmits the remote party's 303a voice to the CTS provider 302 over the PSTN. The CTS provider 302 converts the remote party's 303a speech to text captions to be transmitted to the CTS phone 301. The CTS provider 302 generates text captions by a human operator listening to the speech originating from the remote party device 303, and then generating text captions from the remote party's speech. Generating text captions may include the human operator creating a transcription by typing the remote party's speech or through use of stenography, or re-voicing the words into a microphone. When re-voicing is being used a recording of the human operator's speech as recorded by the microphone is then fed to a speech recognition software application. The speech recognition software application converts the operator's speech to text, and the text is transmitted to the CTS phone 301 for viewing by the CTS party 301a.

FIGS. 3B through 3D illustrate some more specific conventional CTS implementations. FIG. 3B illustrates a conventional "1-line" CTS implementation (i.e., the CTS phone 301 requires one phone line connected to the PSTN). In FIG. 3B, the CTS phone 301 of the CTS party 301a is connected to the CTS provider 302 through a first PSTN connection 304a, and the remote party device 303 of the remote party 303a is also connected to the CTS provider 302 through a second PSTN connection 304b. In this configuration, a user initiates a call by first calling a "1-800" number of the CTS provider 302, and then provides the phone number of the person to be called. The voice conversation for the CTS party 301a and the remote party 303a is relayed through the CTS provider 302 over the PSTN connections 304a/304b, and the CTS provider 302 generates text captions from the remote party's 303a voice as described above, and transmits the text captions to the CTS phone 301 through the first PSTN connection 304a.

FIG. 3C illustrates a conventional "2-line" CTS implementation (i.e., the CTS phone 301 requires two phone lines connected to the PSTN). In FIG. 3C, the CTS phone 301 of the CTS party 301a is connected to the CTS provider 302 through a first PSTN connection 304a (i.e., over a first phone line connected to the CTS phone 301), and is also connected to the remote party device 303 of the remote party 303a through a second PSTN connection 304b (i.e., over a second phone line connected to the CTS phone 301). Thus, the voice conversation between the CTS party 301a and the remote party 303a is relayed over the second PSTN connection 304b. The CTS phone 301 also communicates the speech of the remote party 303a to the CTS provider 302 over the first PSTN connection 304a. The CTS provider 302 generates text captions from the remote party's 303a voice as described above, and transmits the text captions to the CTS phone 301 through the first PSTN connection 304a.

FIG. 3D illustrates a conventional Internet Protocol ("IP") CTS implementation. The implementation of FIG. 3D is the same as FIG. 3C, except that instead of the CTS phone 301 connecting to the CTS provider 302 through a connection to the PSTN, the CTS phone 301 connects to the CTS provider 302 through an Internet connection 305. The CTS phone 301 still connects to remote party devices 303 over the PSTN 304.

Due to the technical limitations of the PSTN, all existing CTS implementations—including each of the foregoing example implementations—require extensive involvement of a human operator at a CTS provider. Such human involvement is undesirable for a variety of reasons. For example, use of a human operator in each CTS call makes RS's very expensive. In addition, involvement of a human operator presents privacy concerns, introduces delay in the conversation (i.e., a delay as an operator is re-voicing, or a delay as the operator creates a transcription), and can lead to inaccuracies in the text captions, may require human operators with specialized skills (e.g., the ability to speak and listen at the same time, fast and accurate typing skills, stenography skills), among other things.

BRIEF SUMMARY

At least some embodiments described herein provide technical solutions for improving text captioning of CTS calls, by providing computer systems, computer-implemented methods, and computer program products for automating the text captioning of CTS calls. These technical solutions include, among other things, unique uses of next-generation networks, particular customizations to communication devices for automating text captioning, and adaptive captioning computer hardware. Technical solutions also include enhancements to the user experience of one or more of the CTS party and the remote party, through enhanced caption presentation and other feedback.

Some embodiments are directed to generating text captions from speech data. Generating text captions from speech data can include receiving speech data based on a remote party's voice at a first communications device, and generating first text captions from the speech data using a speech recognition algorithm. Generating text captions from speech data can also include determining whether the generated first text captions meet a first predetermined quality threshold. When the first text captions meet the first predetermined quality threshold, the first text captions are sent to a second communications device for display at a display device. When the first text captions do not meet the first predetermined quality threshold, second text captions are generated from the speech data based on user input to the speech recognition algorithm from a human user. The second text captions are then sent to the second communications device for display at the display device when the second text captions meet a second predetermined quality threshold.

Other embodiments are directed to intercepting and modifying a calling sequence for calls to captioned telephone service users. These embodiments include detecting that a mobile phone is to participate in a phone call, and determining that the phone call is with a captioned telephone service user. Based on the phone call being with a captioned telephone service user, the mobile phones captures, at the one or more audio capture devices, a high-fidelity recording of a user's voice. Speech data is then sent to an adaptive captioning service based on the high-fidelity recording.

Yet other embodiments are directed to generating progressive text captions from speech data. These embodiments of progressive text caption generation include receiving speech data based on a remote party's voice, and generating preliminary text captions from the speech data. The preliminary text captions include at least one text caption having a confidence score below a predefined threshold. The preliminary text captions are sent to a communications device for display at a display device, along with an instruction to visually annotate the least one text caption having a confidence score below the predefined threshold. Final text captions are also generated from the speech data. The final text captions include a different caption result for the least one text caption. The different caption result for the least one text caption is sent to the communications device for display at a display device, along with an instruction to dynamically update the least one text caption with the different caption result.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein provide technical solutions for improving text captioning of CTS calls, by providing computer systems, computer-implemented methods, and computer program products for automating the text captioning of CTS calls. These technical solutions include, among other things, unique uses of next-generation networks, particular customizations to communication devices for automating text captioning, and adaptive captioning computer hardware. Technical solutions also include enhancements to the user experience of one or more of the CTS party and the remote party, through enhanced caption presentation and other feedback.

Figure 1:
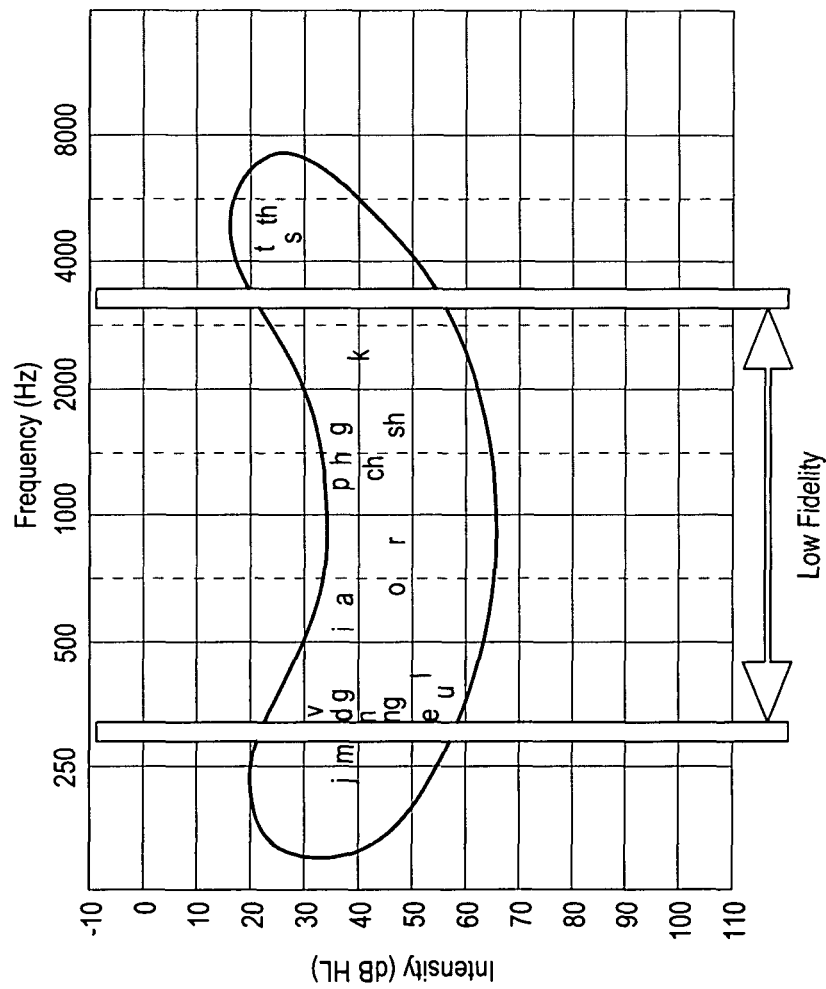
FIG. 1 illustrates a low-fidelity frequency range conveyed by a standard landline.
Figure 2:
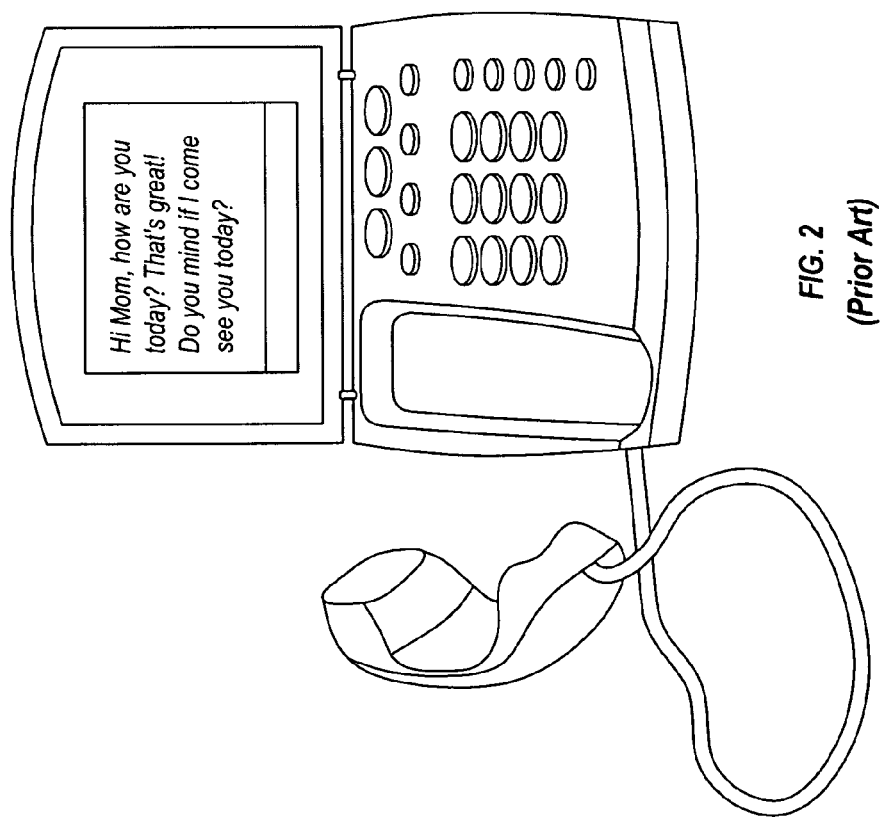
FIG. 2 illustrates a conventional CTS telephone.
Figure 3A:
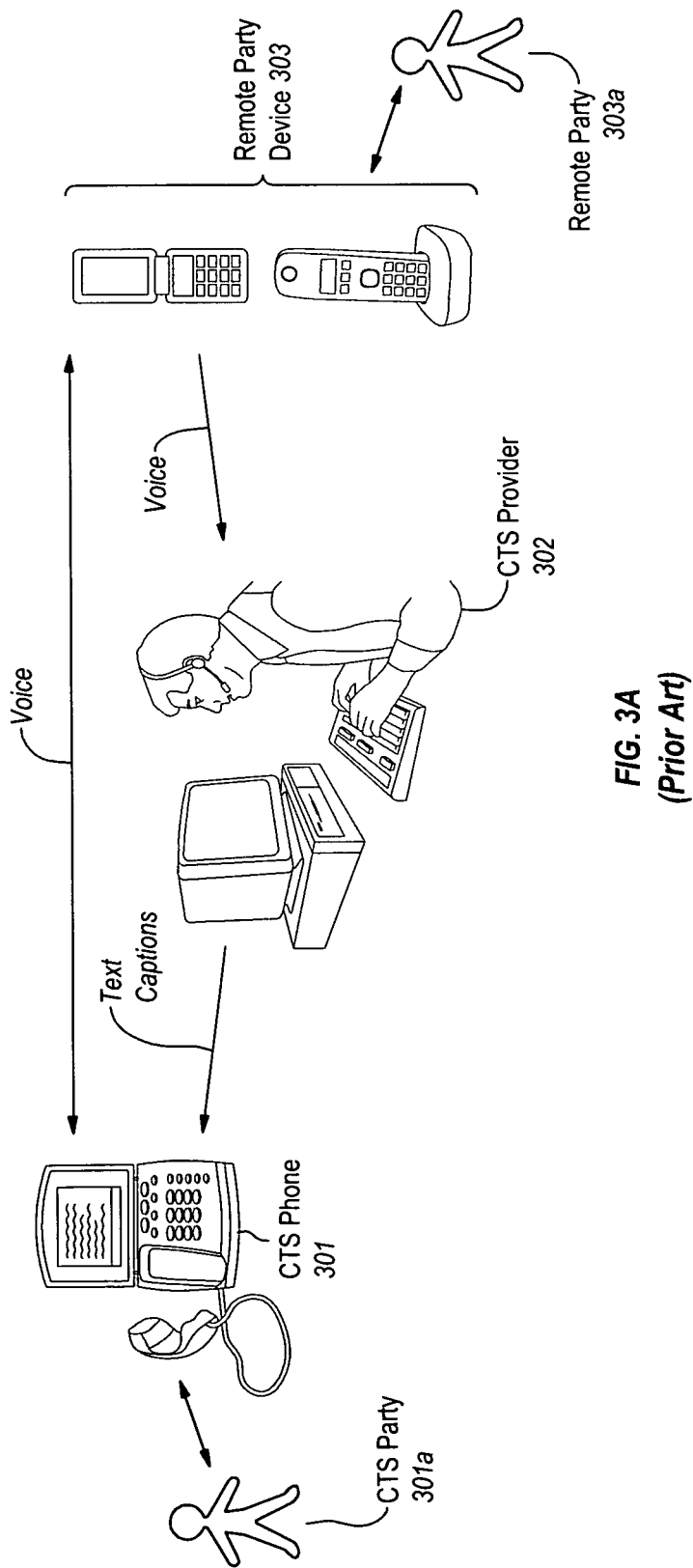
FIG. 3A illustrates an overview of conventional CTS implementations.
Figure 3B:
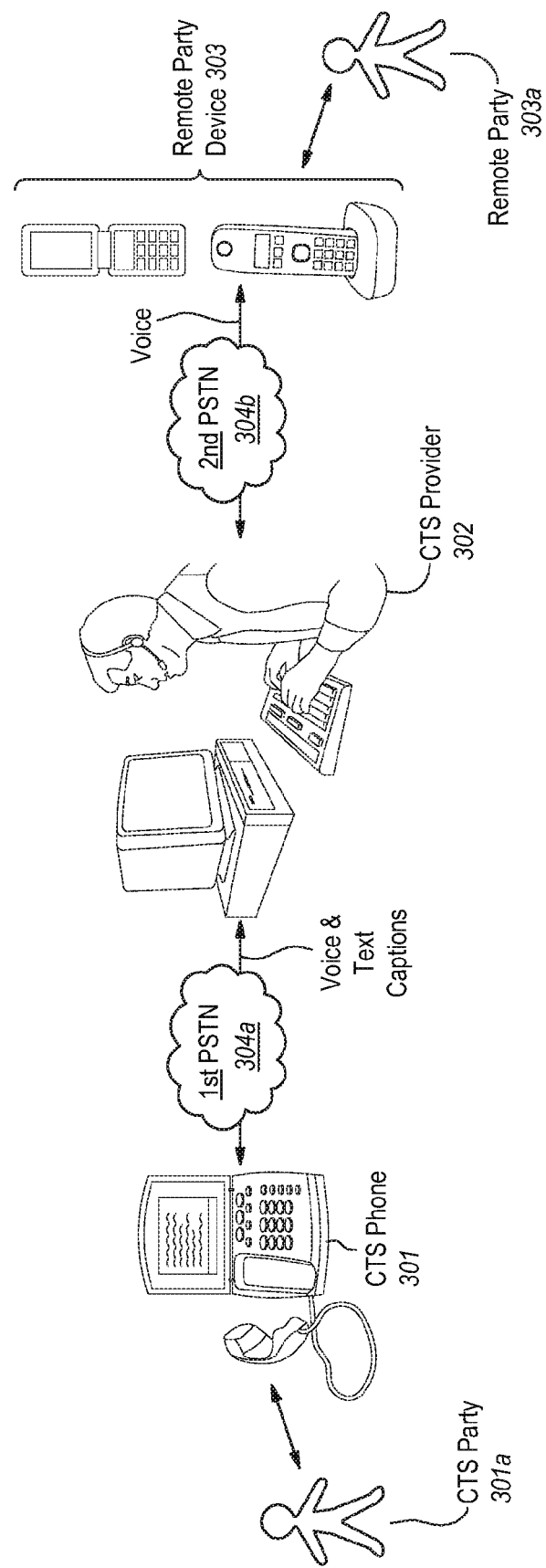
FIG. 3B illustrates a conventional "1-line" CTS implementation.
Figure 3C:
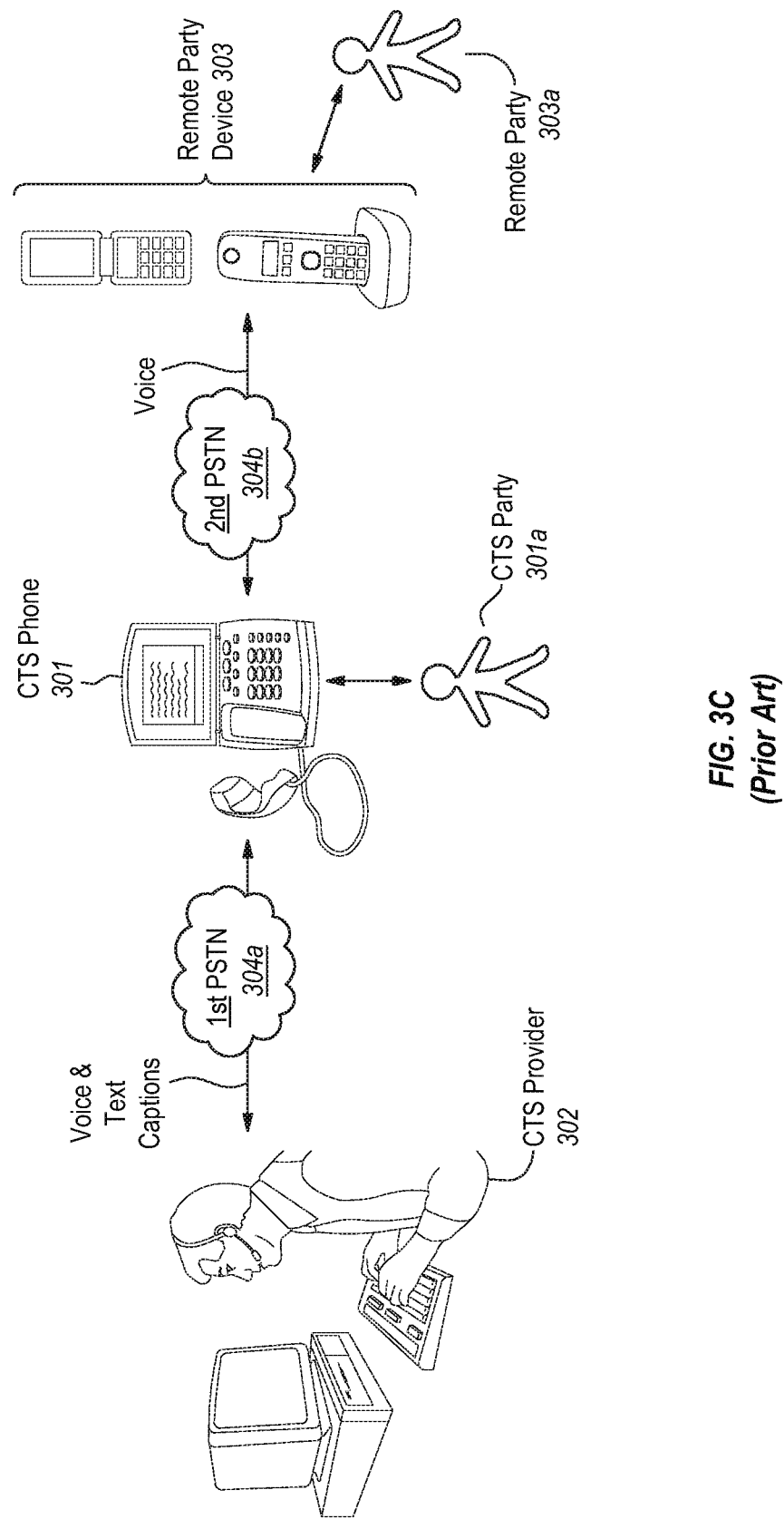
FIG. 3C illustrates a conventional "2-line" CTS implementation.
Figure 3D:
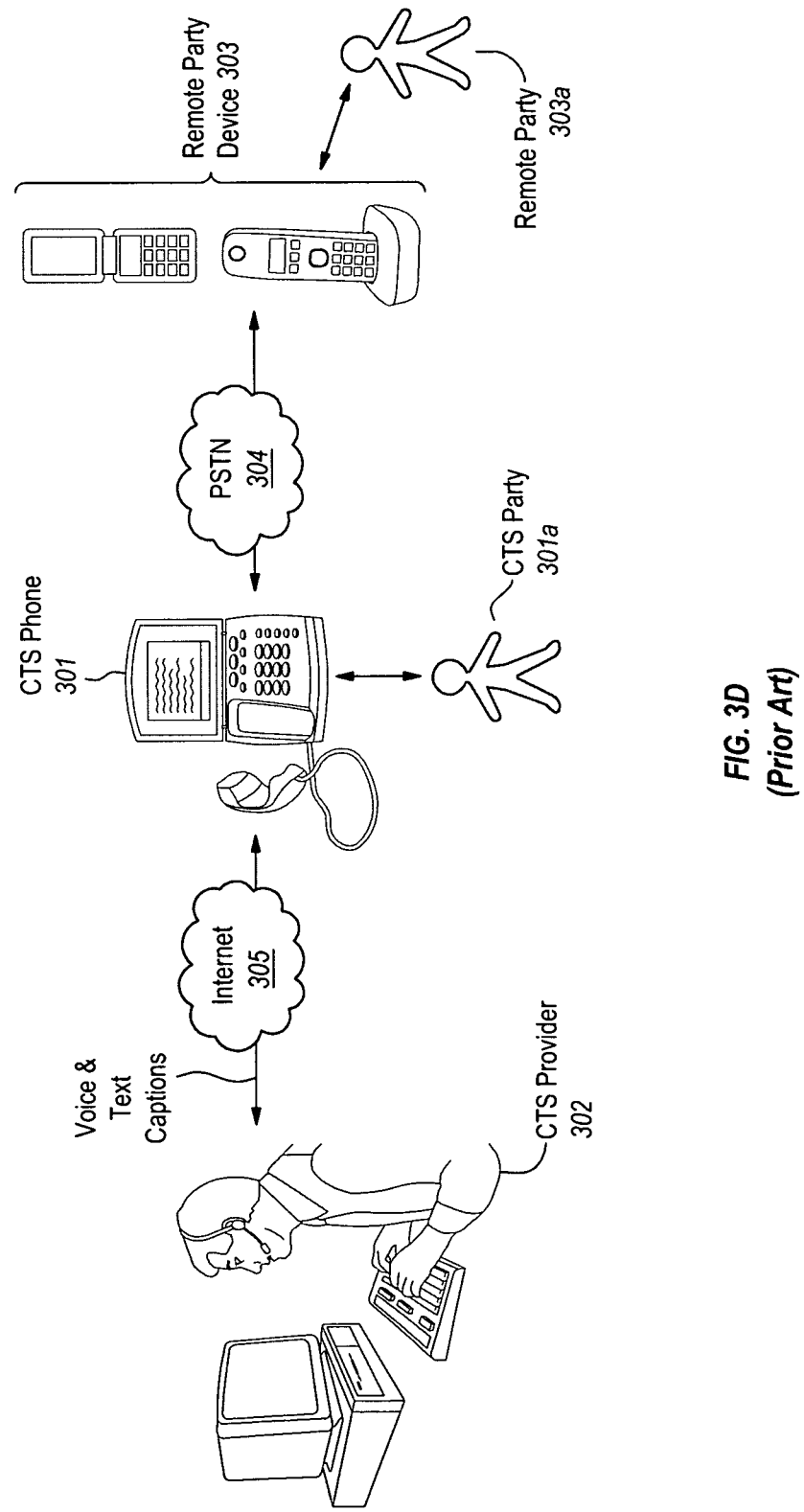
FIG. 3D illustrates a conventional "IP" CTS implementation.

As used in this description and in the claims, "low-fidelity" refers to a frequency range that is inadequate to represent a significant portion of human speech, including being inadequate to fully convey the pronunciations of one or more of j, m, f, s, th, v, d, g, n, ng, and e. As defined herein, a low-fidelity frequency range is one that does not extend significantly beyond the approximate low-fidelity frequency range illustrated in FIG. 1, and which ranges from about 300 Hz to about 3.4 kHz. As discussed previously, the frequency range illustrated in FIG. 1 is the range that is typically conveyed by a conventional landline, and which is inadequate to fully convey most human's pronunciations of j, m, f, s, th, v, d, g, n, ng, and/or e. Other commonly used technologies, such as 2G and 3G wireless technologies such as CDMA, GSM, and EDGE, convey a similar frequency range, and are also considered by this disclosure to use a low-fidelity frequency range.

As used in this description and in the claims, "low-fidelity audio" or "low-definition audio" is an audio recording that is represented within a low fidelity frequency range, due to limitations in a data format of the audio recording, due to limitations in a capture device, and/or due to limitations in a network transporting the audio recording.

Figure 4:
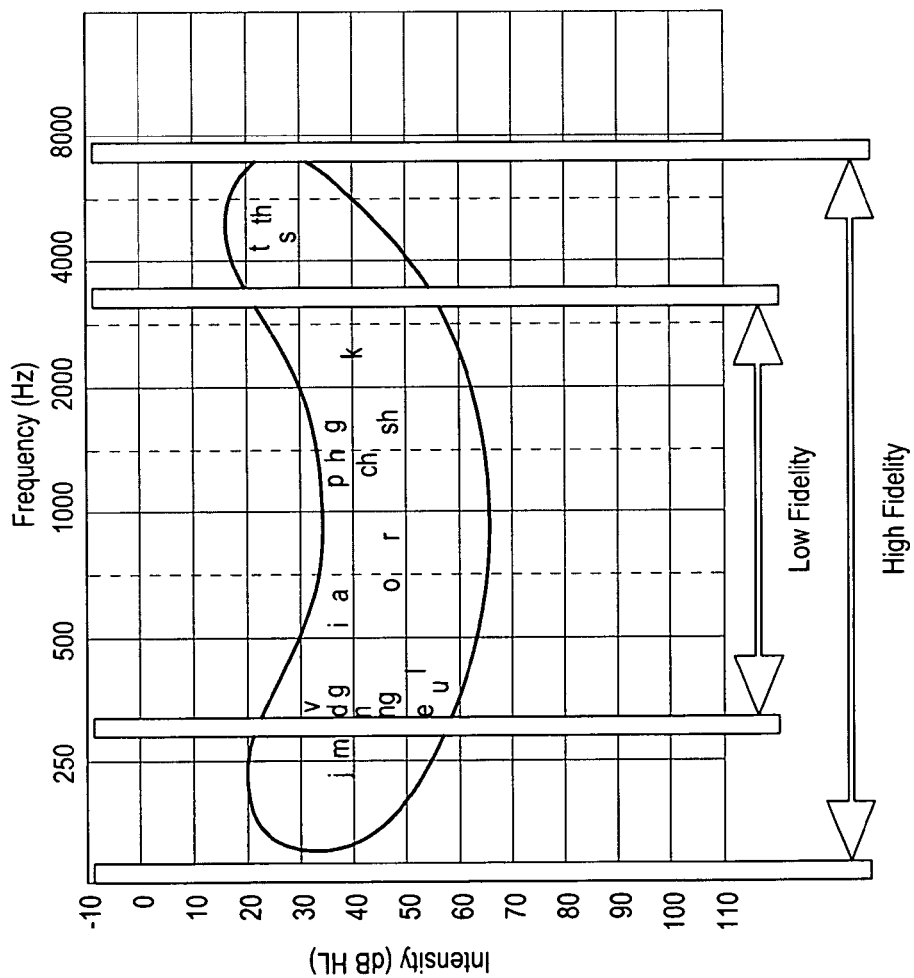
FIG. 4 illustrates a high-fidelity frequency range, according to one or more embodiments.

As used in this description and in the claims, "high-fidelity" refers to any frequency range that is wider than the aforementioned low-fidelity frequency range, and that is capable of fully or nearly-fully representing the full range of human speech, including being adequate to fully convey the pronunciations of each of j, m, f, s, th, v, d, g, n, ng, and e. As illustrated in FIG. 4, a high-fidelity frequency range is defined as extending from approximately 50 Hz to approximately 7 kHz (or any range broader than approximately 50 Hz to approximately 7 kHz), which fully encompasses and extends beyond the low-fidelity frequency range, and which is adequate to fully convey most human's pronunciations of each of j, m, f, s, th, v, d, g, n, ng, and e. Contemporary technologies that are capable of conveying a high-fidelity frequency range include Voice over IP (VoIP) technologies over IP networks such as the Internet (when using underlying broadband infrastructures, whether wired or wireless, having bandwidth and latencies sufficient to convey high-definition VoIP data streams), and fourth-generation (4G) wireless voice technologies, such as 4G Long Term Evolution (LTE) networks using Voice over LTE (VoLTE).

As used in this description and in the claims, "high-fidelity audio," "high-definition audio," or simply "HD audio" is an audio recording that is represented within a high-fidelity frequency range.

As used in this description and in the claims, "conventional operator-assisted captioning techniques" refers to use of a human operator to create a transcription of human speech by typing a remote party's speech, by using stenography, or by re-voicing another party's speech, as described previously.

This disclosure begins with a description of an example computing environment for automating text captioning of CTS calls. This disclosure then continues with a description of some example forms of automated text captioning (e.g., fully-automated and operator-assisted automated) that can be provided in connection with the example computing environment, as well as some example methodologies that may be performed by various components of the example computing environment.

Figure 5:
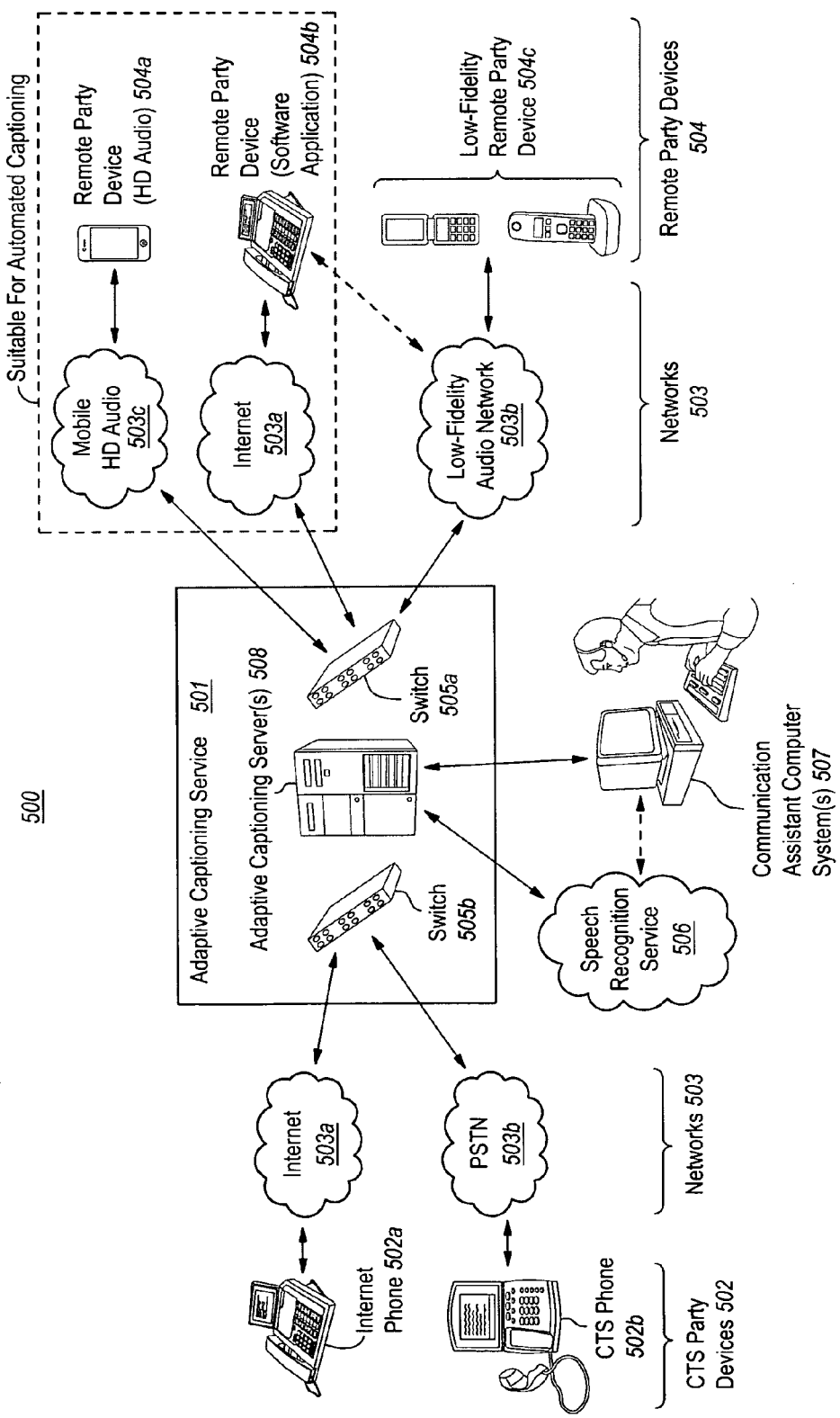
FIG. 5 illustrates an example computer architecture for providing automated captioning services, according to one or more embodiments.

FIG. 5 illustrates an example computer architecture 500 for providing automated captioning services. Referring to FIG. 5, computer architecture 500 includes an adaptive captioning service 501 that connects to both CTS party devices 502 of CTS users and remote party devices 504 of remote parties over a variety of networks 503. The adaptive captioning service 501 provides automated text captioning of remote party speech at one or more remote party devices 504 to one or more CTS party devices 502. In addition, as discussed hereinafter, the adaptive captioning service 501 may also provide text captioning using conventional operator-assisted captioning techniques.

With regards to CTS parties, FIG. 5 depicts that the adaptive captioning service 501 can connect to Internet phones 502a, which communicate with the adaptive captioning service 501 over the Internet 503a. Internet phones 502a can comprise any device that provides two-way voice communications capabilities over an IP network (e.g., using VoIP) as well as visual display capabilities (e.g., a computer display, such as Liquid Crystal Diode, Light Emitting Diode, etc.) for displaying text captions, and that communicates with the adaptive captioning service 501 over the Internet 503a. Internet phones 502a are typically capable of capturing and playing back HD audio, and of transferring that HD audio over the Internet. As used herein, an Internet phone 502a can comprise a dedicated phone device (e.g., a VoIP-based desk phone that includes a display device, a mobile smartphone) or a general-purpose computing device (e.g., tablet computer, wearable device, smartphone, desktop computer, laptop computer) that has been specially configured for communication with the adaptive captioning service 501 by executing computer-executable instructions of a software application. In addition, as used herein, an Internet phone 502a can comprise a plurality of devices, such as a first device that is used to carry out a voice conversation, and a second device that is used to display text captions (e.g., a personal media player, a smartphone, a tablet computer, a laptop/desktop computer, etc.).

In some embodiments, the adaptive captioning service 501 may also connect to conventional CTS phones 502b, which communicate with the adaptive captioning service 501 over the PSTN 503b. As will become clear hereinafter as the adaptive captioning service 501 is discussed in greater detail, the adaptive captioning service 501 can be configured to provide automated text captioning to these conventional CTS phones 502b, and can thus enhance the user experience for a great multitude of CTS users without requiring any change of hardware on the part of the CTS users. As discussed hereinafter, however, when coupled to the adaptive captioning service 501, Internet phones 502a can provide novel enhanced progressive caption display capabilities—and thus a much richer user experience—as compared to conventional CTS phones 502b. For example, Internet phones 502a may be configured to visually convey non-verbal cues (e.g., emotion, sarcasm, humor), to modify text captions in real-time as speech recognition improves, etc., whereas CTS phones 502b may be incapable of such rich features.

With regards to remote parties, FIG. 5 depicts that the adaptive captioning service 501 can communicate with a variety of remote party devices 504 using a variety of networks 503. For example, within the box labeled "Suitable For Automated Captioning," FIG. 5 depicts that the adaptive captioning service 501 can communicate with remote party device 504a over a mobile HD audio network 503c. Remote party device 504a represents any of a variety of devices that are capable of capturing and transferring HD audio. In one example, a remote party device 504a may comprise a device that participates in VoIP calls over the mobile HD network 503c using industry-standard VoIP applications (e.g., Skype, Facetime, etc.). In another example, a remote party device 504a may be a mobile phone device that is capable of participating in high-fidelity voice conversations using VoIP over IP Multimedia Subsystem (IMS) mobile networks. Using a contemporary example, the mobile HD audio network 503c may comprise a 4G LTE network, and the remote party device 504a may be a 4G LTE-capable device, which communicates with the adaptive captioning service 501 over the 4G LTE network using VoLTE. It is noted, however, that the remote party device 504a and the mobile HD audio network 503c are not limited to 4G LTE, and can include any combination of remote party device and network that can convey HD audio to the adaptive caption service 501.

As another example, within the box labeled "Suitable For Automated Captioning," FIG. 5 depicts that the adaptive captioning service 501 can communicate with remote party device 504b, which is configured with a software application, using the Internet 503a. In addition, the remote party device 504b may potentially communicate with the adaptive captioning service 501 using a low-fidelity audio network 503b (i.e., the PSTN, comprising mobile 2G/3G networks, landlines, etc.). Remote party device 504b represents any of a great variety of devices that are capable of capturing HD audio, that can be customized with a software application, and that can establish a two-way voice conversation with the adaptive captioning service 501 over one or both of the Internet 503a and the low-fidelity network 503b. Examples of remote party devices 504b include mobile phone devices, dedicated Internet (VoIP) phones, wearable devices, tablets, laptop computers, desktop computers, or any other computing device that has been specially configured for communication with the adaptive captioning service 501 by executing computer-executable instructions of a specialized software application.

As discussed in more detail later, the remote party devices 504b that are configured with a software application can communicate a variety of data to the adaptive captioning service 501, such as one or more of HD audio, low-fidelity audio, and intermediary speech data elements. For example, a remote party device 504b may establish a two-way VoIP connection with the adaptive captioning service 501 over the Internet, and send HD audio over the VoIP connection. In another example, a remote party device 504b may establish a VoIP connection with the adaptive captioning service 501 over the Internet 503a and communicate HD audio to the adaptive captioning service 501 over the VoIP connection, but also establish a low-fidelity connection with the adaptive captioning service 501 (or some other device, such as CTS phone 502b) over the low-fidelity audio network 503b. In yet another example, a remote party device 504b may establish a low-fidelity connection with the adaptive captioning service 501 (or some other device, such as CTS phone 502b) over the low-fidelity audio network 503b, and send intermediary speech data elements (e.g., based on the remote party device 504b performing at least part of a speech recognition algorithm) over the Internet 503a.

In some embodiments, the adaptive captioning service 501 may also communicate with conventional low-fidelity remote party devices 504c (e.g., 2G/3G mobile phones, conventional landline phones, or any other conventional low-fidelity PSTN device) over the low-fidelity audio network 503b. The adaptive captioning service 501 can thus be configured to provide conventional CTS services (i.e., conventional operator-assisted captioning techniques) for low-fidelity remote party devices 504c.

The adaptive captioning service 501 includes one or more adaptive captioning servers 508 that are connected to the networks 503 of the CTS party devices 502 and the remote party devices 504 through one or more switches 505a/505b. The switches 505a/505b may convert communications as necessary. For example, switch 505a may receive HD audio communications from remote party devices 504a or 504b over the mobile HD audio network 503c or the Internet 503a, and transfer that HD audio to the adaptive captioning servers 508. In another example, the switch 505a may receive low-fidelity audio from remote party device 504c over the low-fidelity audio network 503b, and convert that low-fidelity audio to a form suitable for processing by the adaptive captioning servers 508 (e.g., a digital format for transmission using VoIP) prior to passing it to the adaptive captioning servers 508. In another example, the switch 505b may receive audio and text captions from the adaptive captioning servers 508, and pass them to the CTS party devices 502 in the appropriate format (e.g., VoIP for Internet phones 502a, or the PSTN for conventional CTS phones 502b).

As depicted, the adaptive captioning servers 508 are communicatively coupled to a speech recognition service 506 and to one or more communication assistant computer systems 507. While the speech recognition service 506 and the communication assistant computer systems 507 are depicted as being separated from the adaptive captioning service 501 (e.g., owned and/or operated by third party entities), one or more of these may be part of the adaptive captioning service 501 (e.g., owned and/or operated by the same entity). In addition, any of the adaptive captioning servers 508, the speech recognition service 506, and the communication assistant computer systems 507 may be distributed over a variety of physical geographical locations, regardless of the entity to which they belong or by whom they are operated.

Using the adaptive captioning servers 504, the speech recognition service 506, and/or the communication assistant computer systems 507, the adaptive captioning service 501 performs automated text captioning of speech of remote parties, and provides the text captions to the CTS party devices 502. In general, the adaptive captioning service 501 is configured to provide automated text captioning for high-fidelity remote party devices 504a and 504b (i.e., devices that transfer HD audio and/or intermediary speech data elements). However, in some embodiments, the adaptive captioning service 501 is also configured to use conventional operator-assisted captioning techniques for conventional low-fidelity remote party devices 504c that use low-fidelity audio networks 503b. As such, the adaptive captioning service 501 can provide text captioning to the full spectrum of users, including both users of high-fidelity devices and users of legacy low-fidelity devices.

While the adaptive captioning service 501 may be capable of providing conventional operator-assisted captioning techniques for conventional low-fidelity remote party devices 504c that use low-fidelity audio networks 503b, the remaining disclosure focuses on automated text captioning of high-fidelity speech captured on high-fidelity remote party devices (e.g., the devices/networks with the box labeled "Suitable For Automated Captioning"). It is noted, however, that in some embodiments the adaptive captioning service 501 may attempt to perform automated text captioning even on CTS calls involving low-fidelity remote party devices 504c that use low-fidelity audio networks 503b.

Through use of speech recognition by the speech recognition service 506 on high-fidelity audio generated by a remote party device 504a/504b, and/or through use of intermediary speech data elements generated by a remote party device 504b, the adaptive captioning service 501 can eliminate, and at the very least reduce, using human operators for captioning on CTS calls. Further, even when human operators are used on CTS calls, their involvement can be simplified by eliminating the need for conventional operator-assisted captioning techniques. The adaptive captioning service 501 and the adaptive captioning servers 508 are labeled as being "adaptive," since they are configured to adapt the manner of generating text captions based on a variety of factors, such as call quality, user preference, recognition quality, etc. In particular, depending on call quality, background noise, user preference, remote party speech characteristics (e.g., accent, volume, enunciation, etc.), and any other relevant factors, the adaptive captioning service 501 can employ fully either automated text captioning, or operator assisted automated text captioning (or migrate between the two). In addition, the adaptive captioning service 501 and the adaptive captioning servers 508 are further adaptive since they are configured to be trained during the speech recognition process for improved speech recognition results, as discussed later.

Fully automated text captioning includes the adaptive captioning service 501 generating text captions from a remote party's speech without any human intervention. Operator assisted automated text captioning includes any situation in which the adaptive captioning service 501 employs human assistance, to any extent, when converting a remote user's speech to text captions. As discussed herein after, while operator assisted automated text captioning may include use of conventional operator-assisted captioning techniques, in preferred embodiments it involves less human interactions that are significantly less than conventional operator-assisted captioning techniques and that are thus faster and potentially less expensive to provide than conventional operator-assisted captioning techniques.

Figure 6:
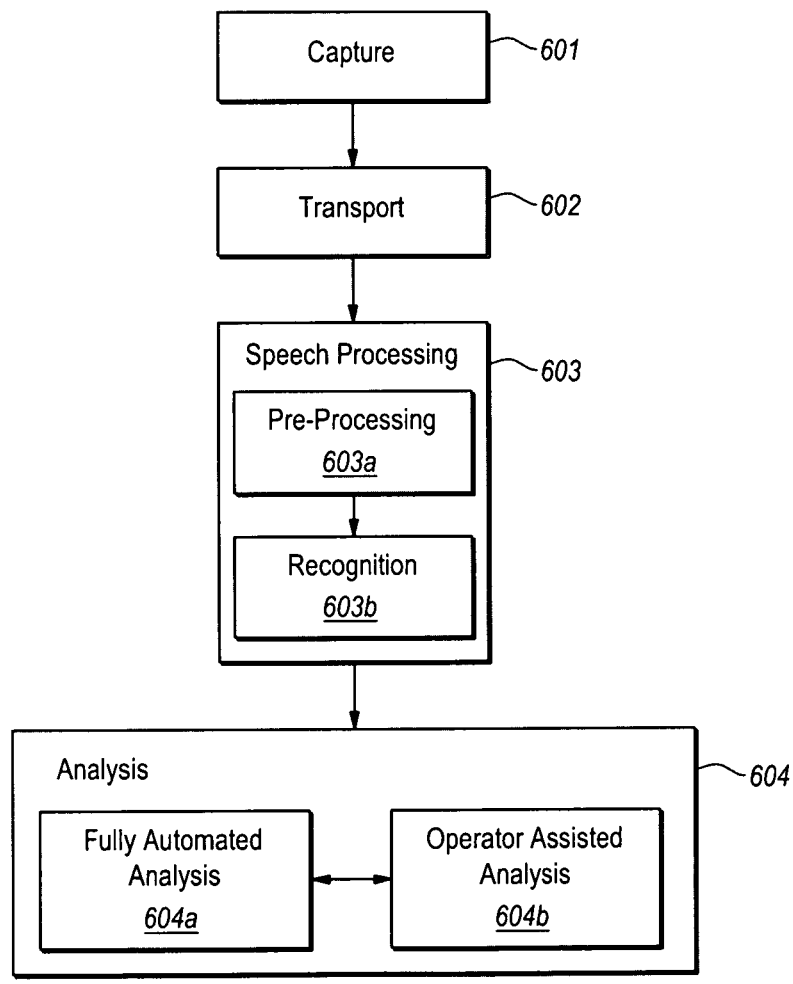
FIG. 6 illustrates phases of automated text captioning, according to one or more embodiments.

In some embodiments, automated text captioning includes four phases, which are depicted in the flow 600 of FIG. 6. It is noted that, while FIG. 6 depicts the phases in a largely linear manner, this is for ease in illustration only. Rather, during a typical CTS call, these phases are typically performed continuously and simultaneously throughout the call, with remote party speech input being continually provided to the flow 600, and text captioning output being continually generated by the flow 600. As depicted in FIG. 6, automated text captioning can include a capture phase 601, a transport phase 602, a speech-processing phase 603, and an analysis phase 604. As depicted, the analysis phase 604 can be varied depending on whether the automated text captioning is utilizing fully automated text captioning (604a) or operator assisted automated text captioning (604b).

The capture phase 601 of automated text captioning includes capturing a speech at a remote party device in high fidelity (e.g., using remote party devices 504a/504b), and preferably with enough fidelity to fully preserve the speech.

When the capture phase 601 is being performed by a remote party device 504a that is capable of capturing HD audio and transporting that HD audio over a mobile HD audio network 503c (e.g., a mobile phone that participates in VoLTE calls), the remote party device 504a may simply participate in the call (e.g., by initiating a call or receiving a call over the mobile HD audio network 503c) as is normal for the device. For example, this may include a mobile phone placing or receiving a telephone call using the phone's normal telephony application. In another example, this may include a standard VoIP application (e.g., Skype, Facetime, etc.) placing or receiving a VoIP call as is normal for the VoIP application. As such, a remote party device 504a may be usable for CTS calls with the adaptive captioning service 501 without any modification.

When the capture phase 601 is being performed by a remote party device 504b that is configured with a software application, the capture phase 601 may be performed in a variety of manners. Examples are given for remote party devices 504b comprising mobile phones that are configured with a software application, and remote party devices 504b comprising other non-phone computing devices (e.g., tablets, wearables, laptop/desktop computers, etc.) that are configured with a software application.

When the remote party device 504b is a mobile phone (e.g., a smartphone) that is configured with a software application (e.g., a specific CTS application), computer-executable instructions of the software application can configure the mobile phone to recognize when the mobile phone is about to participate in a phone call (e.g., by initiating a call or receiving a call), and cause the mobile phone to query a database (either locally or via a network connection) to determine if the phone call is with a CTS user.

In one embodiment, if the phone call is with a CTS user, the computer-executable instructions cause the mobile phone to capture, in parallel and for the duration of the phone call, both HD audio and low-fidelity "telephony quality" audio from one or more audio capture devices. The mobile phone may then be configured to transfer the HD audio to the adaptive captioning service 501 over the Internet 503a utilizing a broadband network (e.g., WiFi, 4G LTE data, etc.), and to transfer the low-fidelity audio to the adaptive captioning service 501 (or some other device, such as a CTS party device 502) over a low-fidelity audio network 503b (e.g., 2G/3G CDMA, GSM, EDGE, etc.). Additionally or alternatively (e.g., in cases in which a broadband network is not available), the mobile phone may be configured to transfer intermediary speech data elements to the adaptive captioning service 501, as is discussed hereinafter in reference to the transport phase 602.

In another embodiment, if the phone call is with a CTS user, the computer-executable instructions cause the mobile phone to alter the mobile phone's normal dialing process or answering process. In particular, instead of participating in a PSTN or similar low-fidelity audio experience, the computer-executable instructions cause the mobile phone to initiate a high-fidelity audio call experience (if such is possible based on the specific capabilities of the computing device and its associated network). Causing the mobile phone to initiate a high-fidelity audio call experience may involve re-directing the mobile phone's normal voice-network based dialing sequence and replace it with a VoIP call setup over a mobile data network (e.g., 4G LTE).

In circumstances where the mobile phone does not use a separate network for voice and data communications, as would be the case in a VoLTE environment, the computer-executable instructions may not re-direct the mobile phone's dialing sequence (or answering sequence), but may instead influence the dialing sequence by enforcing a ruleset that gives preference for a HD audio experience as part of that phone call. For example, in a VoLTE mobile call where the Session Initiation Protocol (SIP) is used for setting up and tearing down a phone call, the mobile phone may be configured to preferentially list high-fidelity audio codecs in a Session Description Protocol (SDP) payload associated with either a SIP INVITE or a response to a SIP INVITE to ensure that high-fidelity audio is conveyed (if possible) as part of the phone call. Whether or not the call sequence is first re-directed to the data network from the voice network, the software application may be configured to request a high-fidelity call experience from the network through which that call was placed.

When the remote party device 504b is a non-phone computing device that is configured with a software application (e.g., a specific CTS application), computer-executable instructions of the software application can configure the device to participate in bi-directional audio communications that simulate a traditional phone call, with the exception that the audio capture and transmission includes capturing and transmitting high-fidelity audio over the Internet 503a. Additionally or alternatively (e.g., in cases in which a broadband network is not available), the computing device may be configured to transfer intermediary speech data elements to the adaptive captioning service 501, as is discussed hereinafter in reference to the transport phase 602.

Returning to FIG. 6, the transport phase 602 of automated text captioning includes conveyance of speech information captured by the remote party devices 504 in the capture phase 601 to the adaptive captioning service 501 in a manner that preserves the high-fidelity speech information, for processing by an automated continuous speech recognition algorithm (e.g., speech recognition service 506) used by the adaptive captioning service 501. Depending on the how the speech was captured, there are at least two embodiments on how the speech information may be transported.

In a first transport embodiment, the remote party device 504 transmits the remote user's speech as a collection of HD audio samples according to a high-fidelity audio codec. For example, remote party device 504a can transfer HD audio over mobile HD audio network 503c to the adaptive captioning service 501, and remote party device 504b can transfer HD audio over the Internet 503a to the adaptive captioning service 501.

In a more specific example, if the capture phase 601 involved negotiating a high-fidelity codec as part of a SIP based VoIP call, the audio samples could be compressed in a way that preserves frequency information typically unavailable when transmitted as part of a PSTN-based phone call. Based on the nature of the call setup process, the VoIP call may either include the adaptive captioning service 501 functioning as a gateway or switching element in the call between the remote party device 504 and the CTS party device 502. In this situation, the adaptive captioning service 501 may create a copy of the remote party's HD audio to deliver to a speech recognition algorithm, and forward the original copy to the CTS party device 502. If the adaptive captioning service 501 is not functioning as a gateway or switching element between remote parties and CTS parties, the CTS party's device may forward a copy of the remote party's HD audio over an Internet-based connection to the adaptive captioning service 501.

In a second transport embodiment, the remote user's device 504b executes a subset of an overall speech recognition algorithm, to generate intermediary speech data elements. These intermediary data elements are then transmitted via a network 503 to the adaptive captioning service 501, where the remaining portions of the speech recognition algorithm can operate using the intermediary speech data elements as input, instead of speech audio samples. In some embodiments, the exact subset of processing done on the remote party device 504b is determined during the phone call, based on the available processing power on the device 504b and/or remote party preferences. As remote party devices 504b increase in processing power, it may be that that an entire speech recognition algorithm may operate on the remote party device 504b, and that the intermediary speech data elements transmitted to the adaptive captioning service 501 would include text recognition candidates produced by the speech recognition algorithm executing at the remote party device 504b.

Returning to FIG. 6, the speech processing phase 603 of automated text captioning includes the work done by an automated speech recognition algorithm, such as a speech recognition algorithm utilized by the speech recognition service 506. In some embodiments, a continuous automated speech algorithm has a plurality of inputs, including audio speech samples, grammars, dictionaries, as well as "training data" that allows a recognition engine to be "trained" to the speech inflections and pronunciations of a particular individual. Typical output from an automated speech recognition algorithm includes a list of candidate recognition results with associated confidence scores. As depicted, in some embodiments the speech processing phase 603 can involve two or more steps, including a pre-processing step 603a and a recognition step 603b.

The pre-processing step 603a is generally implemented by a speech recognition algorithm (e.g., one executing at the speech recognition service 506), which inspects characteristics of the remote party's speech audio samples (or intermediary speech data elements), collectively referred to herein as "speech input," to determine an appropriate set of training data to apply to the speech recognition process. In some embodiments, the criteria by which the training data is selected is based on a number of factors including, for example, a phone number associated with a remote party device 504, a network path 503 by which the speech input is delivered, an estimation of the frequency content available within the speech input, and a detection of the codecs that may have been used to transport the speech input.

In addition to selecting training data, the pre-processing step 603a may also select grammars and dictionaries to use for the recognition step 603b. Selection of grammars and dictionaries may include one or more general language grammars and one or more general vocabulary dictionaries. The selection of grammars and dictionaries may also include selection of one or more specific grammars and/or dictionaries based on relevant sources, such as news items, trending topics on social media networks, current events, and topics of general interest. The selection of grammars and dictionaries may also include selection of grammars and/or dictionaries targeted to both the remote party and the CTS user (e.g., based on the content of past CTS calls).

For example, when using a remote party device 504b running a software application, the software application (preferably with the remote party's approval) may instruct the remote party device 504b to traverse the remote party's email, the remote party's social media network(s), the remote party's text message history, and/or other relevant documents or information. During the traversal, the remote party device 504b can collect proper nouns (such as names of friends, locations, businesses, etc.) and other language or phrases used by the remote party, and which would likely not exist in a general purpose grammar or dictionary. This information may be stored in a private dictionary or grammar file (e.g., at the remote party device 504b, at the adaptive captioning servers 508, and/or at the speech recognition service 506), and may be included as input to the recognition step 603b, in addition to general dictionaries and grammar files. A similar private dictionaries/grammars may also be developed for the CTS user, and may also be included as input to the recognition step 603b. Additionally, one or both of the CTS user and the remote party may manually configure a list of language and phrases to be included in a private dictionary.

The recognition step 603b is implemented by a continuous speech recognition algorithm, with inputs that are provided by the pre-processing step 603a. The output of the recognition step 603b can include a list of candidate recognition results, with associated confidence scores. For example, if the speech input consisted of audio samples or intermediary speech data elements from the spoken phrase of "I like to recognize speech", the recognition step may produce the output of Table 1. The output of the recognition step 603b can then be fed to the analysis phase 604.

TABLE 1

Candidate Recognition Results

| Confidence | Phrase |
| --- | --- |
| 96% | "I like to recognize speech" |
| 88% | "I'd like to wreck a nice beach" |
| 67% | "I'd like to wreck a nice peach" |

As mentioned earlier, the analysis phase 604 differs depending on whether fully automated text captioning is being provided (fully automated analysis 604a), or whether operator assisted automated text captioning is being provided (operator assisted analysis 604b). As indicated by the horizontal arrow between fully automated analysis 604a and operator assisted analysis 604b, the analysis phase 604 can dynamically switch between fully automated text captioning and operator assisted automated text captioning. For example, during a first portion of a CTS call, fully automated text captioning can be provided; then, depending on changing factors (e.g., user preference, call quality, recognition quality, etc.), during a second portion of a CTS call, operator assisted automated text captioning can be provided (or vice versa).

In general, the analysis phase 604 includes applying a set of criteria to the candidate responses of the recognition step 603b of the speech processing phase 603, and determining the most appropriate choice to be transmitted to the CTS user. Speech recognition output often is iterative, with partial/preliminary results with potentially low confidence being output by the speech recognition algorithm, and then later replaced by final results that have higher confidence. Using the above example of a spoken phrase of "I like to recognize speech", the sequence of partial/preliminary results might be delivered to the analysis phase 604 as shown in Table 2.

TABLE 2

Partial Results

| Sequence | Type | Confidence | |
| --- | --- | --- | --- |
| 1 | Partial | 78% | I like |
| 2 | Partial | 82% | I like to |
| 3 | Partial | 83% | I'd like to wrek |
| 4 | Partial | 85% | I like to recognize |
| 5 | Partial | 90% | I like to recognize speech |
| 6 | Final | 95% | I like to recognize speech |

When fully automated text captioning is being provided, fully automated analysis 604a is utilized. The fully automated analysis 604a includes automatically determining which results to deliver to the CTS user. This determination can be based on a variety of criteria, such as the foregoing confidence score, information regarding the remote party's voice fidelity, etc. In some embodiments, partial/preliminary results are sent to the CTS user, which may be replaced by final results at a later time, as discussed further hereinafter.

When operator assisted automated text captioning is being provided, operator assisted analysis 604b is utilized. The operator assisted analysis 604b includes first automatically determining the most appropriate results to be transmitted to the CTS user (e.g., as in the fully automated analysis 604a). Then, input from a human operator at the communication assistant computer systems 507 is used to augment the automated results in order to improve the accuracy of the results.

In a first embodiment of operator assisted automated text captioning, the communication assistant computer systems 507 provide input to the speech recognition service 506, based on user input from a human operator at the communication assistant computer systems 507. For example, the human operator may listen to the remote party's speech at the same time that the remote party's speech is used as input to the speech recognition service 506, and the human user may input the first letter, or the first few letters, of each word spoken by the remote party as the human operator hears them. Use of a portion of words, and not an entire transcription, allows a human operator to better keep pace with the speech cadence of the remote party. Based on the input from the communication assistant computer systems 507, the speech recognition service 506 can examine the list of candidate recognition results, both partial and final, with their associated confidence scores derived during the speech recognition process, and compare the candidates with the typed characters from the human operator to find results that best match the typed characters.

For example, when presented with the spoken phrase of "I like to wreck a nice beach", a human operator may type the following characters "ILTWANB." If the recognition candidates included each of the phrases "I like to recognize speech" and "I like to wreck a nice beach," (underlined characters emphasized to show the characters typed by the human operator), the speech recognition service 506 could select the latter recognition candidate for transmittal to the CTS user, since the latter recognition candidate better matches the typed characters provided by the communication assistant computer system 507 based on human operator input.

In a second embodiment of operator assisted automated text captioning, a communication assistant computer system 507 presents a human operator the remote party's voice at the same time that the remote party's voice is used as input to the speech recognition service. The communication assistant computer system 507 also presents the human operator a list of recognition candidates, and enables the operator select the most appropriate fit based on what they hear.

In either embodiment, the communication assistant computer systems 507 may enable the human operator to dynamically insert language, proper names, phrases, etc. (which may be added as a new dictionary or added to an existing dictionary to be used by the speech recognition algorithm), and to annotate the text captions, such as to convey emotion, sarcasm, laughter, etc.

These two embodiments of operator assisted automated text captioning may be used separately or together, to allow an operator to be involved in improving the recognition results, while incurring minimal overall delay to the delivery of text captions to the CTS user.

In some embodiments, text caption results, themselves, are also used to improve the speech recognition service 506. For example, preliminary captions generated by the speech processing phase 603 may be different from final captions generated by the analysis phase 604. When this is the case, the final captions and/or data generated during the captioning process (e.g., text or audio contributed by a human operator) can be used to "train" the speech recognition service 506. In one example, if the preliminary captions recognized the phrase "Six Sailors" and the final captions corrected the phrase to be "Fix Failures", the final captions can be used to instruct the speech recognition service 506 that it is incorrectly identifying "S" when it should identify "F", at least for this particular speaker. In another example, the original first party audio recording (e.g., from a remote party) may be compared with a recording of a human operator's re-voicing to improve the speech recognition service's 506 interpretation of at least the first party's speech (e.g., by identifying similarities and/or differences between the two recordings, and mapping these similarities/differences to recognition successes or failures). Regardless of the training method, training data can be used to improve the speech recognition service 506 with respect to a particular connection (e.g., based on line quality), with respect to a particular speaker, or generally by aggregating data derived from a plurality of users or conversations.

As mentioned earlier, the adaptive captioning service 501 is configured to adapt the manner of generating text captions based on a variety of factors, such as call quality, user preference, recognition quality, etc. As such, embodiments include a decision process for determining how a particular CTS call should be captioned (e.g., fully-automated, operator-assisted automated, or falling back to conventional transcribing or re-voicing by a human operator). In some embodiments, the decision process is based on settings provided by the CTS party (and/or the remote party), along with criteria derived from evaluating a currently used caption generation approach to determine if it is "good enough" or if a different approach is needed to improve the quality of the captions as delivered to the CTS party.

In some embodiments, and as will become clear in connection with the description of FIG. 7 below, the decision process is configured to favor text captioning methods in the descending order of: (1) fully automated text captioning, then (2) operator assisted automated text captioning, and then (3) conventional operator-assisted captioning techniques. In some embodiments, fully automated text captioning is the preferred method in the circumstances that the CTS party and/or the remote party has not enforced a specific preference, so long as the text caption quality meets desired levels of accuracy.

Figure 7:
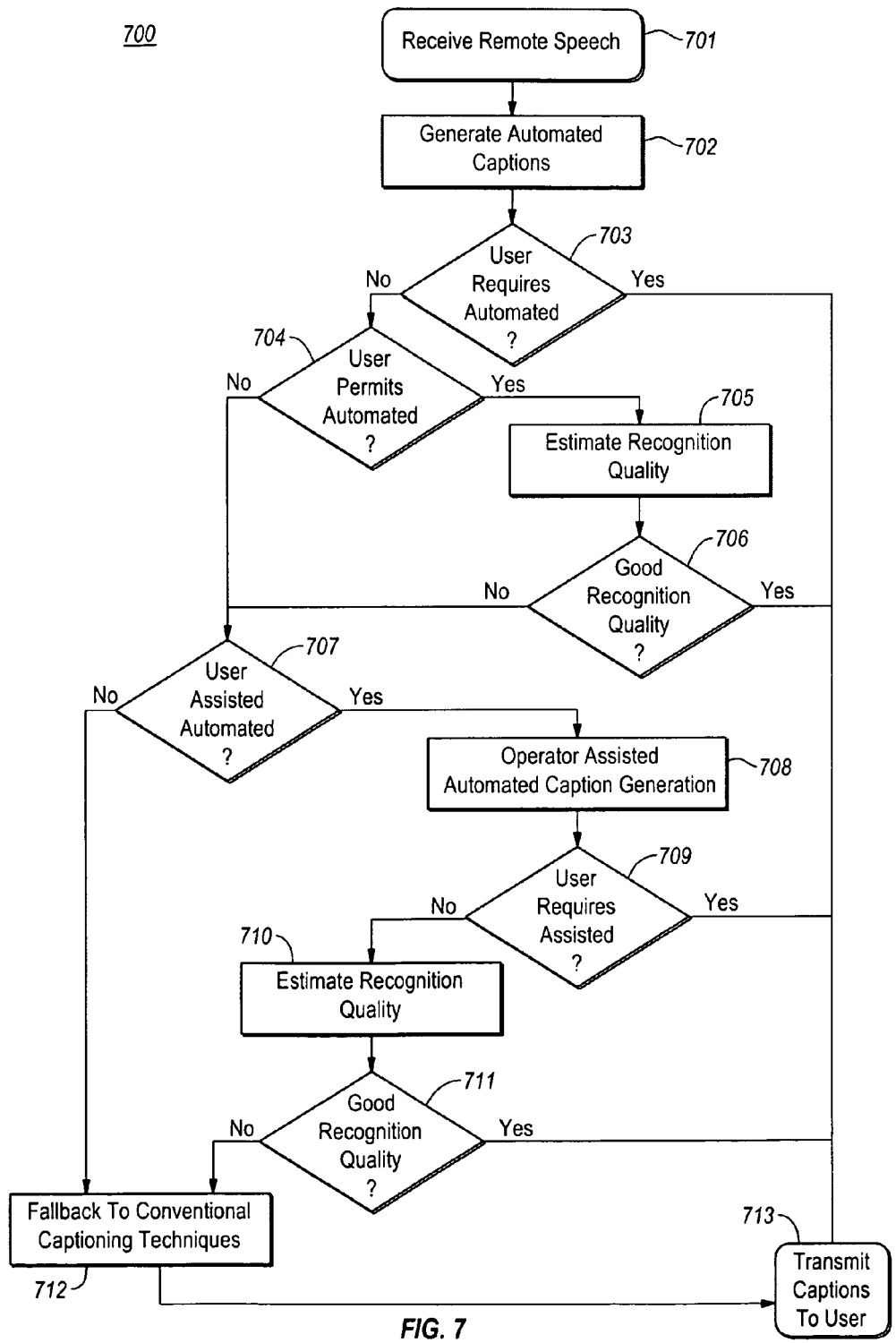
FIG. 7 illustrates an example decision process for adapting the manner of generating captions, according to one or more embodiments.

In accordance with the foregoing, FIG. 7 illustrates an example adaptive decision process 700 that may be implemented at the adaptive captioning servers 508 for adapting the manner of generating captions, and which employs both fully automated text captioning and operator assisted automated text captioning. One of ordinary skill in the art will recognize that the decision process 700 is merely one example of how the adaptive captioning servers 508 can adapt during the generation of text captions, and that it could be varied according to different goals, use of different factors, etc. In addition, while the decision process 700 is depicted in a linear manner, this is for ease in illustration only. Instead, the decision process 700 would typically be continuously applied throughout a CTS call. As such, the manner of generating captions may change one or more times throughout a call, based on changing factors such as call quality, background noise, dynamically changing quality thresholds, etc. The decision process 700 is described in view of the computer architecture 500 of FIG. 5.

As depicted in FIG. 7, the decision process 700 includes receiving remote party speech data (act 701). For example, act 701 may include receiving speech data over any of networks 503 from any remote party device 504, and preferably from a high-fidelity remote party device 504a/504b. This speech data may comprise HD audio data and/or intermediary speech artifacts.

The decision process 700 also includes generating automated captions (act 702). For example, the adaptive captioning servers 508 can use the speech recognition service 506 to generate text captions, or at least attempt to generate text captions, from the remote party speech data that was received in act 701.

The decision process 700 also includes determining whether the user requires fully automated text captioning (act 703). For example, the adaptive captioning service 501 may be configured to receive user preferences from the CTS party and/or the remote party, including whether text captioning for their conversations must always be performed fully automatically using the speech recognition service 506. For example, a party may choose to require fully automatic text captioning due to privacy considerations, since operator assisted text captioning necessarily introduces a third party human listener into the conversation, or due to responsiveness considerations, since fully automated text captioning would generally be the fastest captioning method. In such cases ("yes" in act 703), the text captions that were generated in act 702 are transmitted to a CTS Party device 502 in act 713.

If the user does not require fully automated text captioning ("no" in act 703), the decision process 700 also includes determining whether the user permits fully automated text captioning (act 704). For example, the adaptive captioning service 501 may be configured to receive a user preference from CTS parties and/or remote parties of whether text captioning may be performed fully automatically. For example, some parties may not trust the quality of fully automated text captioning, or may otherwise prefer having operator-assisted captioning, and disallow fully automated text captioning.

If the user permits fully automated text captioning ("yes" in act 704), the decision process 700 also includes, at act 705, estimating the recognition quality of the captions that were generated in act 702 and, at act 706, determining whether the recognition quality satisfies a quality threshold. For example, the adaptive captioning servers 508 may perform grammatical checks, compare the results with prior results for that CTS user's conversations, etc. If the recognition quality satisfies the quality threshold ("yes" in act 706) then the text captions that were generated in act 702 are transmitted to a CTS Party device 502 in act 713.

In some embodiments the quality threshold is determined based, at least in part, on comparing preliminary captions with final captions generated by the speech recognition flow 600, and using the final captions as a factor in measuring the quality of the preliminary captions. While the quality threshold may be static, it may also be dynamically updated as the speech recognition service 506 is trained (e.g., for a particular user, for a particular conversation, or generally). In some embodiments, the same quality threshold is used for all calls. In other embodiments, there is a different quality threshold for different users, different sessions, different connection types, etc. In some embodiments, the quality threshold may be based, at least in part, on user preferences.

In one embodiment, determining the quality threshold by measuring the quality of the preliminary captions based on final captions may include temporally aligning both the preliminary and final captions, including aligning text segments in the preliminary captions and in the final captions that occur temporally together. When performing the temporal alignment, the alignment may take into account a time delay of generating the final captions, since the preliminary captions would typically be generated faster than the final captions. Measuring the quality of the preliminary captions may also include performing an analysis of the aligned text segments to measure the difference and/or error rate between the aligned text segments. In some embodiments, the analysis of the aligned text segments includes computing a word-based Levenshtein Distance between the text segments (i.e. a count the number of word based insertions, deletions, and/or replacements that are required to make the text segments equal). The computed "difference" between the two aligned text segments can be an element used in determining quality threshold and/or if the preliminary captions meet the quality threshold.

If the user does not permit fully automated text captioning ("no" in act 704), or if the recognition quality does not satisfy the pre-determined quality criteria ("no" in act 706), the decision process 700 also includes determining whether the user permits assisted automated text captioning (act 707). As discussed above, assisted automated text captioning is a mode of text captioning in which text captions are generated by the speech recognition service 506 and/or the adaptive captioning servers 508, in connection with additional data provided by the communication assistant computer systems 507 based on user input from human operators at the communication assistant computer systems 507.

If the user does not permit assisted automated text captioning ("no" in act 707), then at act 712 the decision process 700 falls back to traditional operator-assisted captioning techniques (i.e., by human operators at the communication assistant computer systems 507) to generate text captions, and these text captions are then transmitted to a CTS Party device 502 in act 713.

If the user does permit assisted automated text captioning ("yes" in act 707), then text captions are generated using operator assisted automated caption generation (act 708). For example, as discussed above in connection with FIG. 6, human operators may key the first letter or letters of each word spoken by a remote party, may verify/correct automatically generated captions, may supplement captions with additional indicators (e.g., emotion, sarcasm, laughter), etc. If the user requires assisted caption generation ("yes" in act 709), the operator assisted text captions that were generated in act 708 are transmitted to a CTS Party device 502 in act 713.

If the user does not require assisted caption generation ("no" in act 709), then the quality of the operator assisted text captions is estimated in act 710 (i.e., similar to act 705) and, if the captioning quality is above a quality threshold ("yes" in act 711), the operator assisted text captions that were generated in act 708 are transmitted to a CTS Party device 502 in act 713. If the captioning quality is below a quality threshold ("no" in act 711), conventional operator-assisted captioning techniques are used at act 712, and the captions generated by conventional operator-assisted captioning techniques are transmitted to a CTS Party device 502 in act 713. The quality threshold used in act 711 may be the same as, or different from, the quality threshold used in act 706.

In some embodiments, the adaptive captioning service 501 is configured to improve text captioning speed and quality even when falling back to conventional operator-assisted captioning techniques (act 712). For example, even though the text captions generated in act 702 may be below quality thresholds, these text captions can still be sent to the communication assistant computer systems 507 for use by the human operators that are using conventional operator-assisted captioning techniques. While these text captions may be of low quality, they may still provide a useful visual reference point to a human operator who is re-voicing or transcribing, to enable the human operator to more easily keep track of the conversation flow. Doing so can potentially lower the threshold for cognitive skill necessary for human operators who perform re-voicing or transcribing, thus allowing persons with lower skill levels to still produce quality captions in a timely manner via conventional techniques.

In some embodiments, in the absence of any preferred settings, the settings default in a way that "User Requires Automated" (703) and "User Requires Assisted" (709) would be set to "no" and "User Permits Automated" (704) and "User Permits Assisted Automated" (707) would be set to "yes." In this configuration, fully automated captioning is initially attempted. If the fully automated text caption quality is above a quality threshold, then the automatically generated text captions are sent the CTS party. If, however, the fully automated text captioning quality is below a quality threshold, then operator assisted automated text captioning is performed and, so long as the quality of the operator assisted automated text captions is above a quality threshold, the operator assisted automated text captions are sent to the CTS party. Otherwise, conventional operator-assisted captioning techniques are used.

As mentioned previously, in some embodiments the adaptive captioning service 501 sends partial (or preliminary) text captioning results to the CTS party devices 502, and then sends final results at a later time. In such embodiments, the CTS party device may comprise an Internet phone 502*a*, which can be configured with a software application to provide a continuous and progressive text caption display, including modifying previously displayed text captions.

Figure 8A:
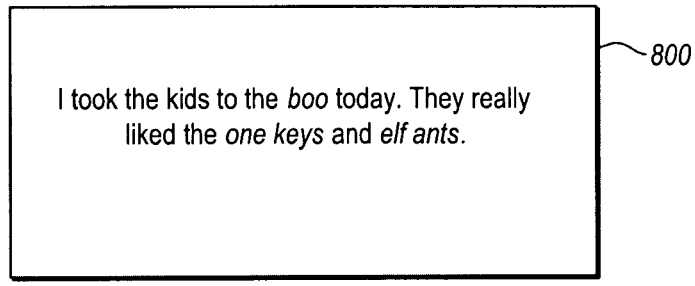
FIG. 8A illustrates an example of progressive text caption display, according to one or more embodiments.
Figure 8B:
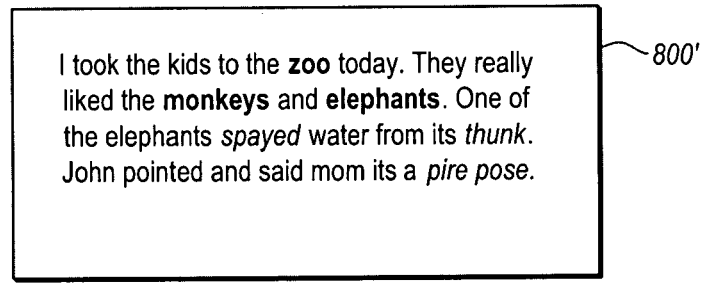
FIG. 8B illustrates an example of progressive text caption display, according to one or more embodiments.
Figure 8C:
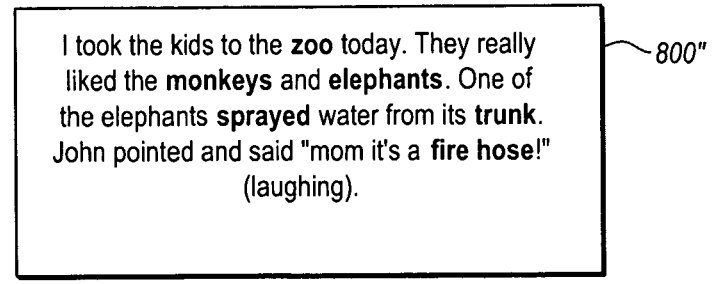
FIG. 8C illustrates an example of progressive text caption display, according to one or more embodiments.

FIGS. 8A-8C illustrate an example of progressive text caption display, as may be displayed at a display device of a CTS party device 502 (e.g., an Internet phone 502*a*). As will be appreciated in view of the disclosure herein, progressive text caption display can advance the technological area of text captioning, by reducing the delay inherent in conventional operator-assisted captioning techniques (by quickly displaying partial/preliminary results), while still ensuring an accurate captioning experience. In the examples of FIGS. 8A-8C, text captioning of the remote party's side of the conversation is depicted, in the context of the remote party speaking the following dialogue:

> I took the kids to the zoo today. They really liked the monkeys and elephants. One of the elephants sprayed water from its trunk. John pointed and said, "Mom, it's a fire hose!"

It is noted that, in FIGS. 8A-8C the captions are progressively presented as phrases (i.e., 'I took the kids to the zoo today. They really like the moneys and elephants' and 'One of the elephants sprayed water from its trunk. John pointed and said, "Mom, it's a fire hose!"'). However, this is for ease in illustration only, and captions may be progressively presented word-by-word or even character-by-character.

FIG. 8A illustrates an initial display 800 of text captions as output by the adaptive captioning service 501. In FIG. 8A, text captions for only the first phrase of the remote party's dialogue (i.e., 'I took the kids to the zoo today. They really liked the moneys and elephants') have been displayed. This may be because the remote party has not spoken the rest of the dialogue, because the rest of the dialogue has not yet been transferred to the adaptive captioning service 501, or because the adaptive captioning service 501 has not processed the rest of the dialogue sufficient to have text caption results ready to send to the CTS party device 502.

In FIG. 8A, partial/preliminary text caption results are being displayed (i.e., 'I took the kids to the boo today they really liked the one keys and elf ants'). For example, these captions may be preliminary results of fully automated text captioning, or may be the results of automated text captioning, prior to input from a human operator. As depicted in FIG. 8A, the speech recognition algorithm has incorrectly recognized the word "zoo" as "boo"; has incorrectly recognized the word "monkeys" as "one keys"; and has incorrectly recognized the word "elephants" as "elf ants." In some embodiments, and as depicted, if the speech recognition algorithm has a low confidence score for certain captions, they can be annotated to reflect such (for example, italics are used in this example, though any indication can be used, such as differing colors, shading, brackets, bolding, differing fonts and/or font sizes, underlining, blinking, etc.).

FIG. 8B illustrates a subsequent display 800' of text captions as output by the adaptive captioning service 501. In FIG. 8B, text captions for the full dialogue have now been displayed. However, the previous partial/preliminary text captions ('I took the kids to the boo today they really liked the one keys and elf ants') have now been dynamically updated with finalized captions (i.e., 'I took the kids to the zoo today. They really liked the monkeys and elephants'). Thus, "boo" has been replaced with "zoo"; "one keys" has been replaced with "monkeys"; and "elf ants" has been replaced with "elephants". In some embodiments, and as depicted, if a text caption is dynamically replaced it is annotated to reflect such (for example, bolding is used in this example, though any indication can be used, such as differing colors, shading, brackets, italics, differing fonts and/or font sizes, underlining, blinking, etc.).

These dynamic updates to the text captions can be based on a speech recognition algorithm having had additional time to process the remote party's speech (e.g., using dictionaries, grammatical analysis, etc.), the speech recognition algorithm having been able to process additional speech from the remote party which caused the speech recognition algorithm to modify its former captions (e.g., by gaining additional insights into the remote user's accent, inflection, vocabulary, etc.), and/or by receiving input from a human operator, in any of the manners disclosed herein (e.g., by typing the first letter or letters of each word, by selecting from among recognition candidates, by making manual corrections, by transcription, by re-voicing, etc.).

In FIG. 8B, the text captions for the latter phrase of the remote party's dialogue are partial/preliminary captions (i.e., 'One of the elephants spayed water from its thunk John pointed and said Mom, its a pire pose'), in which "sprayed" has been recognized as "spayed"; "trunk" has been recognized as "thunk"; and "fire hose" has been recognized as "pire hose." Similar to FIG. 8A, captions with a low confidence are indicated in italics. While these captions are preliminary, they may benefit from the speech recognition algorithm's prior work on the remote party's speech. For example, the speech recognition algorithm has now properly recognized the word "elephants".

FIG. 8C illustrates a final display 800" of text captions as output by the adaptive captioning service 501. In FIG. 8C, the entire remote user's dialogue has been updated with finalized captions. For example, the previous partial/preliminary text captions of the second portion of dialogue ('One of the elephants spayed water from its thunk John pointed and said Mom, its a pire pose') have now been dynamically updated with finalized captions (i.e., 'One of the elephants sprayed water from its trunk John pointed and said, "MOM, IT'S A FIRE HOSE!"'). Thus, the word "spayed" has been replaced with "sprayed"; the word "thunk" has been replaced with "trunk"; and the words "pire pose" have been replaced with "fire hose." Similar to FIG. 8B, text captions that have been dynamically replaced are annotated in bold.

FIGS. 8A-8C also illustrate that, in addition to dynamically updating partial/preliminary interpretations with finalized interpretations, the adaptive captioning service 501 can update other aspects of text captions, and make other appropriate annotations. For example, FIGS. 8A-8C depict that the adaptive captioning service 501 can update grammar and punctuation in the results. Examples include the insertion sentence-end punctuation (e.g., periods, question marks, exclamation points), capitalization (e.g., proper nouns, sentence beginnings), the insertion of other punctuation (e.g., commas, quotes, hyphens), correcting/inserting contractions (e.g., replacing "its" with "it's", as depicted), etc. These corrections can be based on grammatical analysis of a speech recognition algorithm, and/or on input from a human operator.

FIGS. 8A-8C also depict that the adaptive captioning service 501 can modify or annotate captions to convey non-verbal cues that are not usually apparent from text alone. For example, in FIG. 8C the phrase, "MOM, IT'S A FIRE HOSE" is capitalized to indicate shouting or a raised voice. In addition, in FIG. 8C the captions have been annotated with the tag "(laughing)." These modifications may be made based on analysis of a speech recognition algorithm (e.g., detecting raised volume, detecting a change in inflection, etc.), and/or based on input from a human operator. One of ordinary skill in the art will recognize, in view of the disclosure herein, that a great variety of non-verbal cues (e.g., humor, sarcasm, emotion, singing, etc.) can be conveyed in a variety of manners (e.g., color, fonts, formatting, insertion of text/graphics, etc.).

In addition, in some embodiments the adaptive captioning service 501 improves the transparency and accuracy of text captioning by providing feedback to the remote party. Such feedback may modify behaviors on the remote party's part, which may help improve the overall quality of text captioning.

Feedback to the remote party may be visual, such as textual or graphic information displayed on a mobile phone handset, tablet, or other device with a graphical display. Additionally or alternatively, feedback may be audible, such as with tones or whispered speech, or haptic, such as a vibration sequence or sequences.

In some embodiments, feedback informs the remote party whether the caption process is automated, is operator assisted automated, or is using conventional operator-assisted captioning techniques, which informs the remote party whether or not there is human operator involved in the captioning process (i.e., private or non-private). Additionally or alternatively, feedback may instruct the remote party to modify some behavior, such as to alter his or her speech pattern or cadence, to re-position his or her mouth with respect to a microphone, to attempt to eliminate background noise, or to perform any other remote party controlled behavior the may improve the overall quality of the captioning process.

Figure 9:
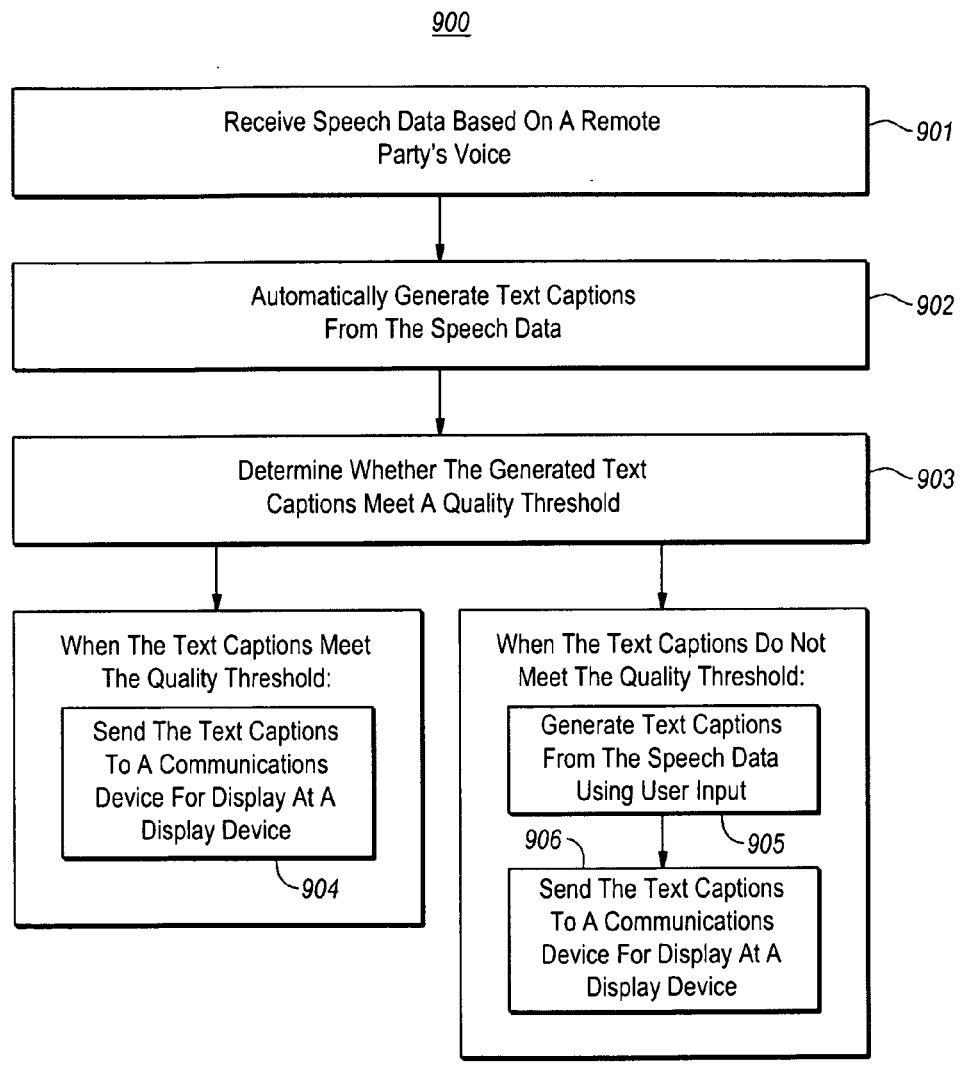
FIG. 9 illustrates an example flowchart of a method for generating text captions from speech data, according to one or more embodiments.

FIG. 9 illustrates a flow chart of an example method 900 for generating text captions from speech data. Method 900 will be described with respect to the components and data of computer architecture 500.

Method 900 comprises an act of receiving speech data based on a remote party's voice (act 901). Act 901 can include receiving, from a first communications device, speech data based on a remote party's voice. For example, the adaptive captioning service 501 can receive speech data from remote party devices 504a/504b at switch 505a or at the adaptive captioning servers 508. The speech data may comprise an HD audio recording and/or intermediary speech data elements.

Method 900 also comprises an act of automatically generating text captions from the speech data (act 902). Act 902 can include generating, at the one or more processors, first text captions from the speech data using a speech recognition algorithm. For example, the adaptive captioning service 508 can automatically generate text captions using the speech recognition service 506.

Method 900 also comprises an act of determining whether the generated text captions meet a quality threshold (act 903). Act 903 can include determining, at the one or more processors, whether the generated first text captions meet a first predetermined quality threshold. For example, the adaptive captioning servers 508 can determine whether the generated captions meet a predetermined quality threshold based on an average confidence score of the results, a threshold of minimum confidence score of the results, a grammatical analysis of the results, etc.

Method 900 also comprises an act of, when the text captions meet the quality threshold, sending the text captions to a communications device for display at a display device (act 904). Act 904 can include, when the first text captions meet the first predetermined quality threshold, sending the first text captions to a second communications device for display at a display device. For example, the adaptive captioning servers 508 can send the results to a CTS party device 502 when the automatically generated text captions meet a quality threshold.

Method 900 also comprises an act of, when the text captions do not meet the quality threshold, generating text captions from the speech data using user input (act 905). Act 905 can include, when the first text captions do not meet the first predetermined quality threshold, generating, at the one or more processors, second text captions from the speech data based on user input to the speech recognition algorithm from a human user. For example, when the automatically generated text captions do not meet the quality threshold, the adaptive captioning servers 508 can utilize the speech recognition service 506 in connection with user input at the communication assistant computer systems 507 to generate operator assisted automated text captions. As discussed previously, operator assisted automated text captioning may include an operator typing the first letter or letters of each word, choosing from among candidate results, making manual corrections, etc.

Method 900 also comprises an act of, when the text captions do not meet the quality threshold, sending the text captions to a communications device for display at a display device (act 906). Act 906 can include, when the first text captions do not meet the first predetermined quality threshold, sending the second text captions to the second communications device for display at the display device when the second text captions meet a second predetermined quality threshold. For example, after generating operator assisted automated text captions, the adaptive captioning servers 508 can send the operator assisted results to a CTS party device 502 when the automatically generated text captions meet a quality threshold. The threshold used in connection with the operator assisted results may be the same as, or different from, the threshold used in connection with the fully automated text captions.

Figure 10:
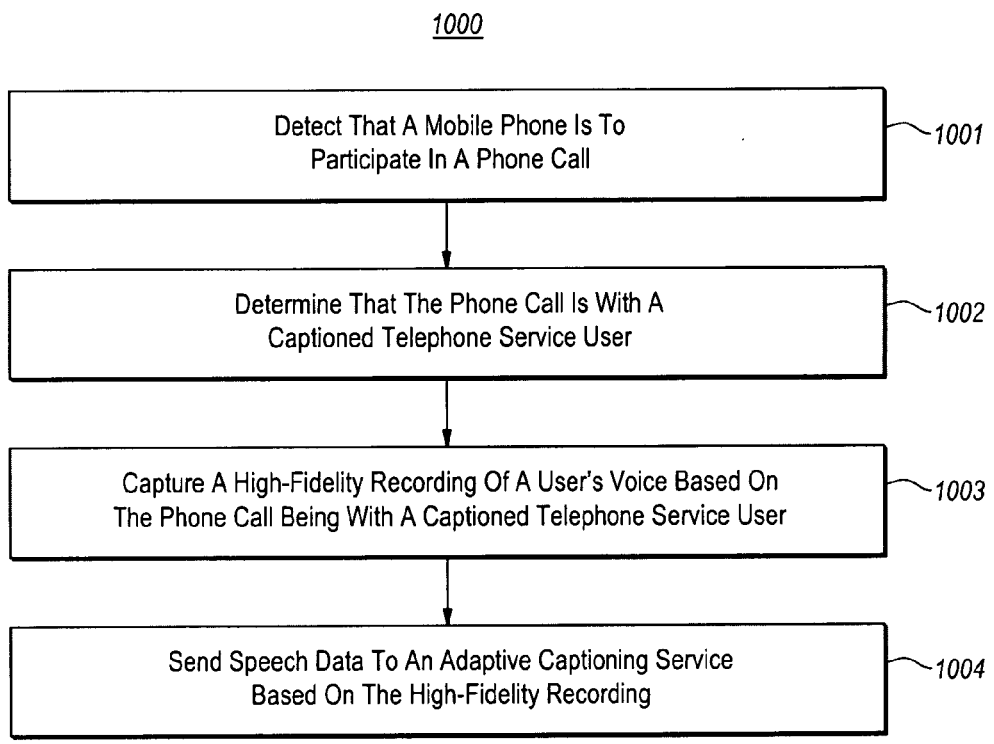
FIG. 10 illustrates an example flowchart of a method for intercepting a calling sequence, according to one or more embodiments.

FIG. 10 illustrates a flow chart of an example method 1000 for intercepting a calling sequence. Method 1000 will be described with respect to the components and data of computer architecture 500.

Method 1000 comprises an act of detecting that a mobile phone is to participate in a phone call (act 1001). Act 1001 can include detecting that the mobile phone is to participate in a phone call. For example, the mobile phone can comprise a remote party device 504b that is configured with a software application. The software application can comprise computer-executable instructions that, when executed by one or more processors of remote party device 504b, cause the remote party device 504b to detect when it is about to participate in a call (e.g., to dial a call or to answer a call).

Method 1000 also comprises an act of determining that the phone call is with a captioned telephone service user (act 1002). Act 1002 can include determining that the phone call is with a captioned telephone service user. For example, the software application can comprise computer-executable instructions that, when executed, cause the remote party device 504b to query a local or remote (e.g., at the adaptive captioning service 501) database to determine if the call is with a CTS party.

Method 1000 also comprises an act of capturing a high-fidelity recording of a user's voice based on the phone call being with a captioned telephone service user (act 1003). Act 1003 can include based on the phone call being with a captioned telephone service user, capturing, at the one or more audio capture devices, a high-fidelity recording of a user's voice. For example, the software application can comprise computer-executable instructions that, when executed, cause the remote party device 504b to capture high fidelity audio at one or more microphones on the remote party device 504b. Additionally or alternatively, the software application can comprise computer-executable instructions that, when executed, cause the remote party device 504b to initiate a high-fidelity network connection and/or to cause the remote party device 504b to use a high-fidelity audio codec.

Method 1000 also comprises an act of sending speech data to an adaptive captioning service based on the high-fidelity recording (act 1004). Act 1004 can include sending speech data to an adaptive captioning service based on the high-fidelity recording. For example, the software application can comprise computer-executable instructions that, when executed, cause the remote party device 504b to send HD audio over a high-definition network connection to the adaptive captioning service 501. Alternatively, the software application can comprise computer-executable instructions that, when executed, cause the remote party device 504b to perform a portion of a speech recognition algorithm to generate intermediary speech data elements, and to transfer these intermediary speech data elements to the adaptive captioning service 501.

Figure 11:
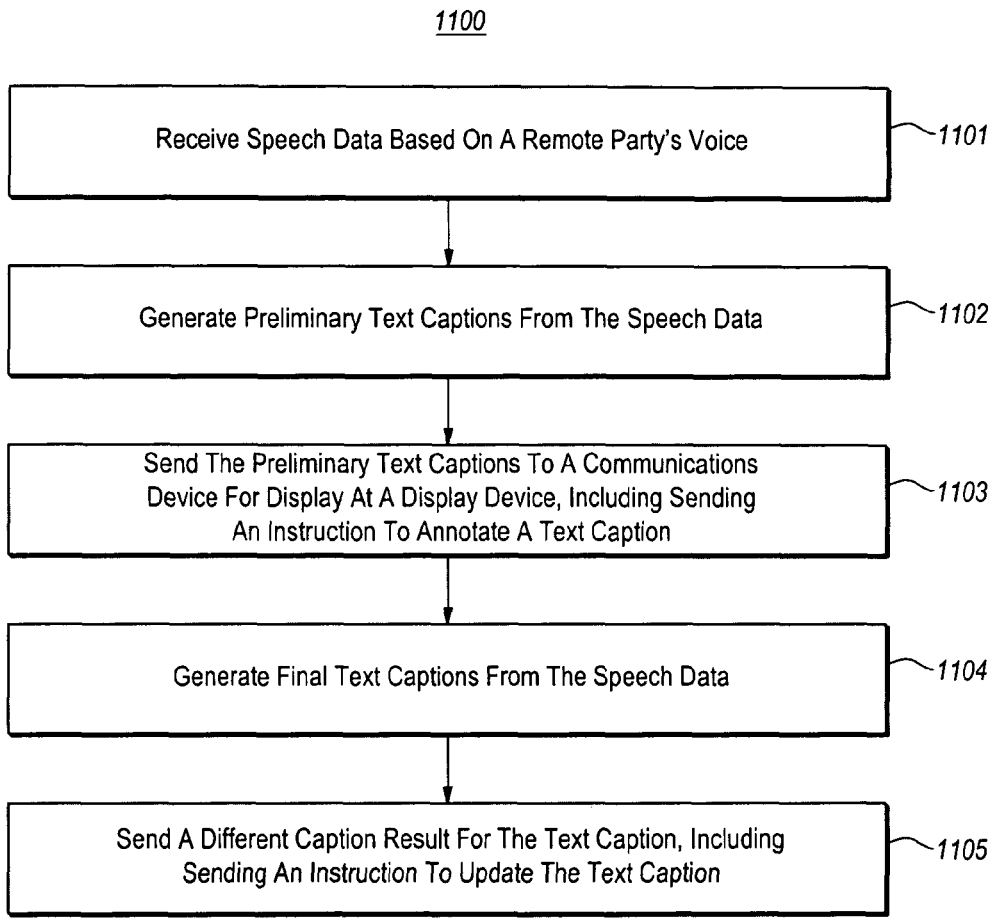
FIG. 11 illustrates an example flowchart of a method for generating progressive text captions from speech data, according to one or more embodiments.

FIG. 11 illustrates a flow chart of an example method 1100 for generating progressive text captions from speech data. Method 1100 will be described with respect to the components and data of computer architecture 500 and the displays 800, 800', and 800" of FIGS. 8A-8C.

Method 1100 comprises an act of receiving speech data based on a remote party's voice (act 1101). Act 1101 can include receiving, from a first communications device, speech data based on a remote party's voice. For example, the adaptive captioning service 501 can receive speech data (e.g., HD audio, intermediary speech data elements) from remote party devices 504a or 504b.

Method 1100 also comprises an act of generating preliminary text captions from the speech data (act 1102). Act 1102 can include generating, at the one or more processors, preliminary text captions from the speech data, the preliminary text captions including at least one text caption having a confidence score below a predefined threshold. For example, the adaptive captioning servers 508 can use the speech recognition service 506 (and potentially the communication assistant computer systems 507) to generate text captions from the speech data (e.g., the dialogue discussed in connection with FIGS. 8A-8C). As depicted in FIG. 8A, some captions may have a low confidence score (e.g., "boo", "one keys", and "elf ants").

Method 1100 also comprises an act of sending the preliminary text captions to a communications device for display at a display device, including sending an instruction to annotate a text caption (act 1103). Act 1103 can include sending the preliminary text captions to a second communications device for display at a display device, including sending an instruction to visually annotate the least one text caption having a confidence score below the predefined threshold. For example, the adaptive captioning servers 508 can send the text captions to an Internet phone 502a, including an instruction to visually annotate the text captions with a low confidence score. For example, the adaptive captioning servers 508 may send the captions, "I took the kids to the boo today they really liked the one keys and elf ants," and provide an instruction to visually annotate the captions "boo", "one keys", and "elf ants". Thus, as shown in FIG. 8A, the Internet phone 502a can then annotate (e.g., italicize) these results.

Method 1100 also comprises an act of generating final text captions from the speech data (act 1104). Act 1104 can include generating, at the one or more processors, final text captions from the speech data, the final text captions including a different caption result for the least one text caption. For example, in connection with further processing by the speech recognition service 506 and/or in connection with user input from the communication assistance computer systems 507, the adaptive captioning severs 508 can identify that the preliminary result "boo" should be "zoo", the preliminary result "one keys" should be "monkeys" and the preliminary result "elf ants" should be "elephants".

Method 1100 also comprises an act of sending a different caption result for the text caption, including sending an instruction to update the text caption (act 1105). Act 1105 can include sending the different caption result for the least one text caption to the second communications device for display at a display device, including sending an instruction for the second communications device to dynamically update the least one text caption with the different caption result. For example, the adaptive captioning servers 508 can send the Internet phone 502b the update captions ("zoo", "monkeys" and "elephants"), along with an instruction to dynamically update the captions to replace the preliminary results (boo", "one keys", and "elf ants") with these finalized results.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
one or more hardware processors; and
one or more non-transitory computer-readable media having stored thereon computer-executable instructions that are structured such that, when the computer-executable instructions are executed by the one or more hardware processors, the computer system generates text captions from speech data, including at least the following:
receiving, from a first communications device, the speech data based on a remote party's voice:
generating, at the one or more hardware processors, first text captions from the speech data using a speech recognition algorithm;
determining, at the one or more hardware processors, whether the generated first text captions meet a first predetermined quality threshold; and
when the first text captions meet the first predetermined quality threshold, sending the first text captions to a second communications device for display at a display device; or
when the first text captions do not meet the first predetermined quality threshold, performing at least the following:
generating, at the one or more hardware processors, second text captions from the speech data based on user input to the speech recognition algorithm from a human user; and
sending the second text captions to the second communications device for display at the display device when the second text captions meet a second predetermined quality threshold.

2. The computer system as recited in claim 1, wherein the speech data based on the remote party's voice comprises a high-fidelity audio recording of the remote party's voice, and wherein the high-fidelity audio recording is received over a high-fidelity network.

3. The computer system as recited in claim 1, wherein the speech data based on the remote party's voice comprises intermediary speech data elements that were generated at the remote communications device based on a high-fidelity audio recording of the remote party's voice.

4. The computer system as recited in claim 1, wherein when the first text captions do not meet the first predetermined quality threshold, the computer system also performs at least the following:
sending the first text captions to the second communications device for display at the display device prior to sending the second text captions to the second communications device; and
wherein to sending the second text captions to the second communications device comprises sending one or more updates to the first text captions.

5. The computer system as recited in claim 1, wherein sending the first text captions to the second communications device for display at the display device comprises sending an instruction for the second communications device to annotate at least one text caption having a low confidence score.

6. The computer system as recited in claim 1, wherein generating the second text captions from the speech data based on the user input to the speech recognition algorithm from the human user comprises generating text captions that are annotated with one or more visual cues.

7. The computer system as recited in claim 6, wherein the one or more visual cues convey one or more of humor, emotion, sarcasm, singing, or laughing.

8. The computer system as recited in claim 1, wherein generating the second text captions from the speech data based on the user input to the speech recognition algorithm from the human user comprises receiving, from the human user, at least a first letter for each of a plurality of words contained in the speech data.

9. The computer system as recited in claim 1, wherein generating the second text captions from the speech data based on the user input to the speech recognition algorithm from the human user comprises:
presenting, to the human user, a plurality of recognition candidates corresponding a portion of the speech data;

receiving, from the human user, selection of one of the plurality of recognition candidates; and generating a text caption based on the selected one of the plurality of recognition candidates.

10. The computer system as recited in claim 1, wherein when the second text captions do not meet the second predetermined quality threshold, the computer system requests conventional operator-assisted captioning techniques.

11. The computer system as recited in claim 1, wherein the second predetermined quality threshold is equal to the first predetermined quality threshold.

12. A computer system comprising a mobile phone, the computer system comprising:
  one or more hardware processors;
  one or more audio capture devices; and
  one or more non-transitory computer-readable media having stored thereon computer-executable instructions that are structured such that, when the computer-executable instructions are executed by the one or more hardware processors, the computer system intercepts a calling sequence, including at least the following:
  detecting that the mobile phone is to participate in a phone call;
  determining that the phone call is with a captioned telephone service user;
  based on the phone call being with the captioned telephone service user, capturing, at the one or more audio capture devices, a high-fidelity recording of a user's voice, wherein the high-fidelity recording comprises audio of a frequency range greater than 300 Hz to 3.4 kHz;
  sending speech data to an adaptive captioning service based on the high-fidelity recording;
  capturing, at the one or more audio capture devices, a low-fidelity recording of the user's voice in parallel with capturing the high-fidelity recording of the user's voice; and
  sending the low-fidelity recording over a first network connection, while sending the high-fidelity recording over a second network connection.

13. The computer system as recited in claim 12, further comprising:
  generating intermediary speech data elements from the high-fidelity recording of the user's voice; and
  wherein sending the speech data to the adaptive captioning service comprises sending the intermediary speech data elements to the adaptive captioning service.

14. The computer system as recited in claim 12, wherein sending the speech data to the adaptive captioning service comprises sending high-fidelity audio to the adaptive captioning service.

15. The computer system as recited in claim 12, further comprising, based on the phone call being with the captioned telephone service user:
  intercepting a native dialing sequence of the mobile phone to prevent the mobile phone from initiating the phone call over a network connection that is incapable of transporting high-fidelity audio; and
  initiating a connection with the adaptive captioning service using the network connection capable of transporting high-fidelity audio.

16. The computer system as recited in claim 12, further comprising, based on the phone call being with the captioned telephone service user:
  influencing a dialing sequence of the mobile phone to give preference for transporting high-fidelity audio as part of the phone call.

17. The computer system as recited in claim 16, wherein influencing the dialing sequence of the mobile phone to give preference for transporting high-fidelity audio as part of the phone call comprises identifying a preferred audio codec.

18. The computer system as recited in claim 12, wherein the high-fidelity recording comprises audio of a second frequency range of at least approximately 50 Hz to approximately 7 kHz.

19. A computer system, comprising:
  one or more hardware processors; and
  one or more non-transitory computer-readable media having stored thereon computer-executable instructions that are structured such that, when the computer-executable instructions are executed by the one or more hardware processors, the computer system generates progressive text captions from speech data, including at least the following:
  receiving, from a first communications device, the speech data based on a remote party's voice;
  generating, at the one or more hardware processors, preliminary text captions from the speech data, the preliminary text captions including at least one text caption having a confidence score below a predefined threshold;
  sending the preliminary text captions to a second communications device for display at a display device, including sending an instruction to visually annotate the least one text caption having the confidence score below the predefined threshold;
  generating, at the one or more hardware processors, final text captions from the speech data, the final text captions including a different caption result for the least one text caption; and
  sending the different caption result for the least one text caption to the second communications device for display at the display device, including sending an instruction for the second communications device to dynamically update the at least one text caption with the different caption result.

20. The computer system as recited in claim 19, wherein sending the different caption result for the least one text caption to the second communications device includes sending the instruction for a second computer system to visually annotate the least one text caption with a different annotation mechanism after dynamically updating the least one text caption with the different caption result.

* * * * *